US 11,762,624 B2

(12) United States Patent
van Erven et al.

(10) Patent No.: US 11,762,624 B2
(45) Date of Patent: Sep. 19, 2023

(54) CAPACITIVE TOUCH SENSOR WITH INTEGRATED ANTENNA(S) FOR PLAYBACK DEVICES

(71) Applicant: Sonos, Inc., Santa Barbara, CA (US)

(72) Inventors: Niels van Erven, Agoura Hills, CA (US); Kasra Payandehjoo, Malden, MA (US); Nicholas D'Amato, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 232 days.

(21) Appl. No.: 16/948,427

(22) Filed: Sep. 17, 2020

(65) Prior Publication Data

US 2021/0089265 A1    Mar. 25, 2021

Related U.S. Application Data

(60) Provisional application No. 62/904,266, filed on Sep. 23, 2019.

(51) Int. Cl.
*G06F 3/16* (2006.01)
*G06F 3/044* (2006.01)
(Continued)

(52) U.S. Cl.
CPC ............ *G06F 3/165* (2013.01); *G06F 3/0443* (2019.05); *H04B 5/0025* (2013.01); *H04R 1/10* (2013.01);
(Continued)

(58) Field of Classification Search
CPC ...... G06F 3/165; G06F 3/0443; G06F 3/0446; H04B 5/0025; H04B 7/0834;
(Continued)

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP    1389853 A1    2/2004
WO    200153994    7/2001
WO    2003093950 A2    11/2003

OTHER PUBLICATIONS

AudioTron Quick Start Guide, Version 1.0, Mar. 2001, 24 pages.
(Continued)

*Primary Examiner* — Carolyn R Edwards
*Assistant Examiner* — Kuassi A Ganmavo
(74) *Attorney, Agent, or Firm* — FINCH & MALONEY PLLC

(57) ABSTRACT

Playback devices can include touch sensor assemblies with one or more integrated antennas. Such touch sensor assemblies can be incorporated into a playback device such as a headphone device. The playback device can include an electrode comprising a first conductor, a second conductor, and a filter coupled between the first and second conductors, a capacitive-touch circuit coupled to the electrode, and a wireless radio coupled to the second conductor. The capacitive-touch circuit is configured to deliver a capacitive sensing signal to the electrode. The wireless radio is configured to facilitate communication over at least one wireless network via the second conductor.

18 Claims, 18 Drawing Sheets

(51) Int. Cl.

| | |
|---|---|
| *H04R 1/10* | (2006.01) |
| *H04B 5/00* | (2006.01) |
| *H04B 7/08* | (2006.01) |
| *H01Q 7/00* | (2006.01) |
| *H01Q 1/27* | (2006.01) |
| *H04R 5/033* | (2006.01) |

(52) U.S. Cl.
CPC ........... *G06F 3/0446* (2019.05); *H01Q 1/273* (2013.01); *H01Q 7/005* (2013.01); *H04B 5/0056* (2013.01); *H04B 7/0834* (2013.01); *H04R 1/1016* (2013.01); *H04R 1/1058* (2013.01); *H04R 5/0335* (2013.01)

(58) Field of Classification Search
CPC ...... H04B 5/0056; H04R 1/10; H04R 1/1016; H04R 1/1058; H04R 5/0335; H01Q 1/273; H01Q 7/005; H01B 1/0475

See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 3,014,423 | A1 | 9/2011 | Thaler et al. |
| 8,045,952 | B2 | 10/2011 | Qureshey et al. |
| 8,103,009 | B2 | 1/2012 | Mccarty et al. |
| 8,234,395 | B2 | 7/2012 | Millington |
| 8,483,853 | B1 | 7/2013 | Lambourne |
| 8,942,252 | B1 | 1/2015 | Balassanian et al. |
| 9,323,404 | B2 | 4/2016 | Calatayud et al. |
| 10,764,666 | B1* | 9/2020 | Napoles .................. H01Q 7/00 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2009/0226013 | A1* | 9/2009 | Burge .................. H04R 1/1041 381/150 |
| 2010/0321325 | A1* | 12/2010 | Springer .............. H01Q 1/2266 345/173 |
| 2012/0329524 | A1* | 12/2012 | Kent ..................... G06F 3/0443 455/566 |
| 2013/0182867 | A1* | 7/2013 | Knowles .............. H04B 7/0834 381/74 |
| 2013/0235331 | A1* | 9/2013 | Heinrich ................ G02C 11/10 351/158 |
| 2014/0111474 | A1* | 4/2014 | Bytheway ........... G06F 3/04164 345/174 |
| 2014/0361979 | A1* | 12/2014 | Woo ..................... H04B 1/0475 343/702 |
| 2015/0185928 | A1* | 7/2015 | Son ....................... G06F 3/0445 345/174 |
| 2015/0206669 | A1* | 7/2015 | Hauck .................. H03K 17/962 29/622 |
| 2015/0220184 | A1* | 8/2015 | Park ...................... G06F 3/0445 345/174 |
| 2015/0303568 | A1* | 10/2015 | Yarga ..................... H01Q 5/321 343/722 |
| 2015/0333802 | A1* | 11/2015 | Yang ..................... H04B 5/005 455/41.1 |
| 2017/0353781 | A1* | 12/2017 | Choi ...................... H04R 1/105 |
| 2018/0034507 | A1* | 2/2018 | Wobak ................. H04B 5/0056 |
| 2018/0212313 | A1* | 7/2018 | Harper .................. H01Q 5/321 |
| 2020/0033968 | A1* | 1/2020 | Yamagishi .......... G06F 3/04162 |

OTHER PUBLICATIONS

AudioTron Reference Manual, Version 3.0, May 2002, 70 pages.
AudioTron Setup Guide, Version 3.0, May 2002, 38 pages.
Bluetooth "Specification of the Bluetooth System: The ad hoc SCATTERNET for affordable and highly functional wireless connectivity," Core, Version 1.0 A, Jul. 26, 1999, 1068 pages.
Bluetooth "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

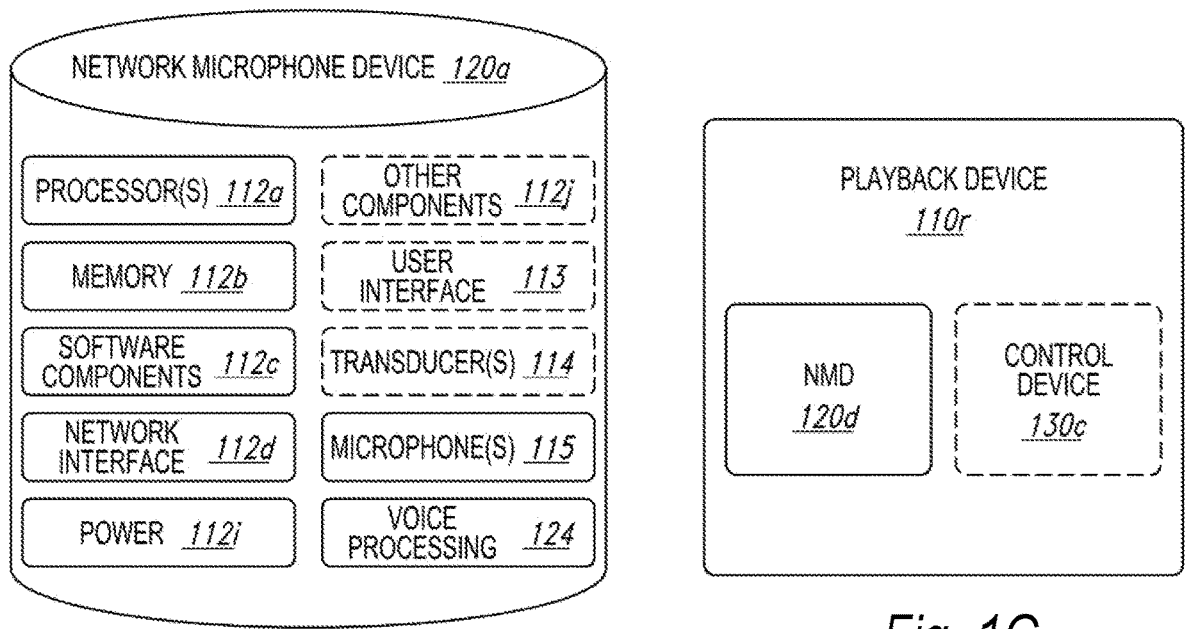
Fig. 1F
Fig. 1G
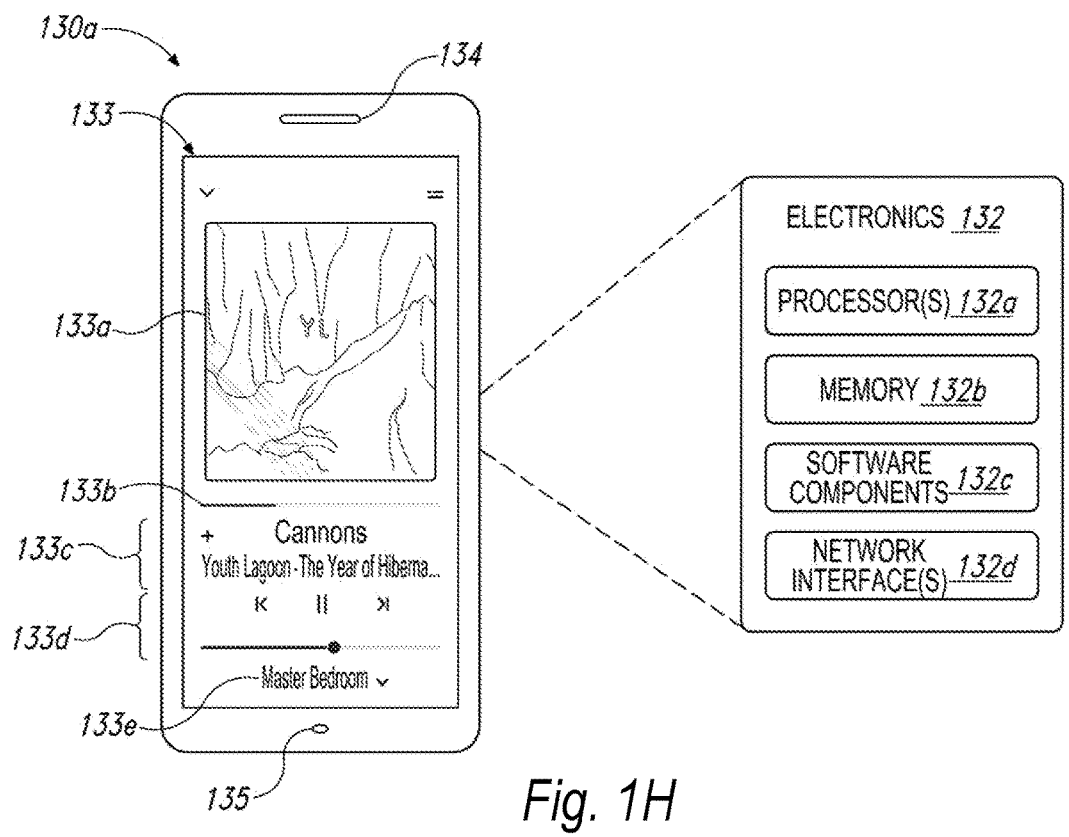
Fig. 1H

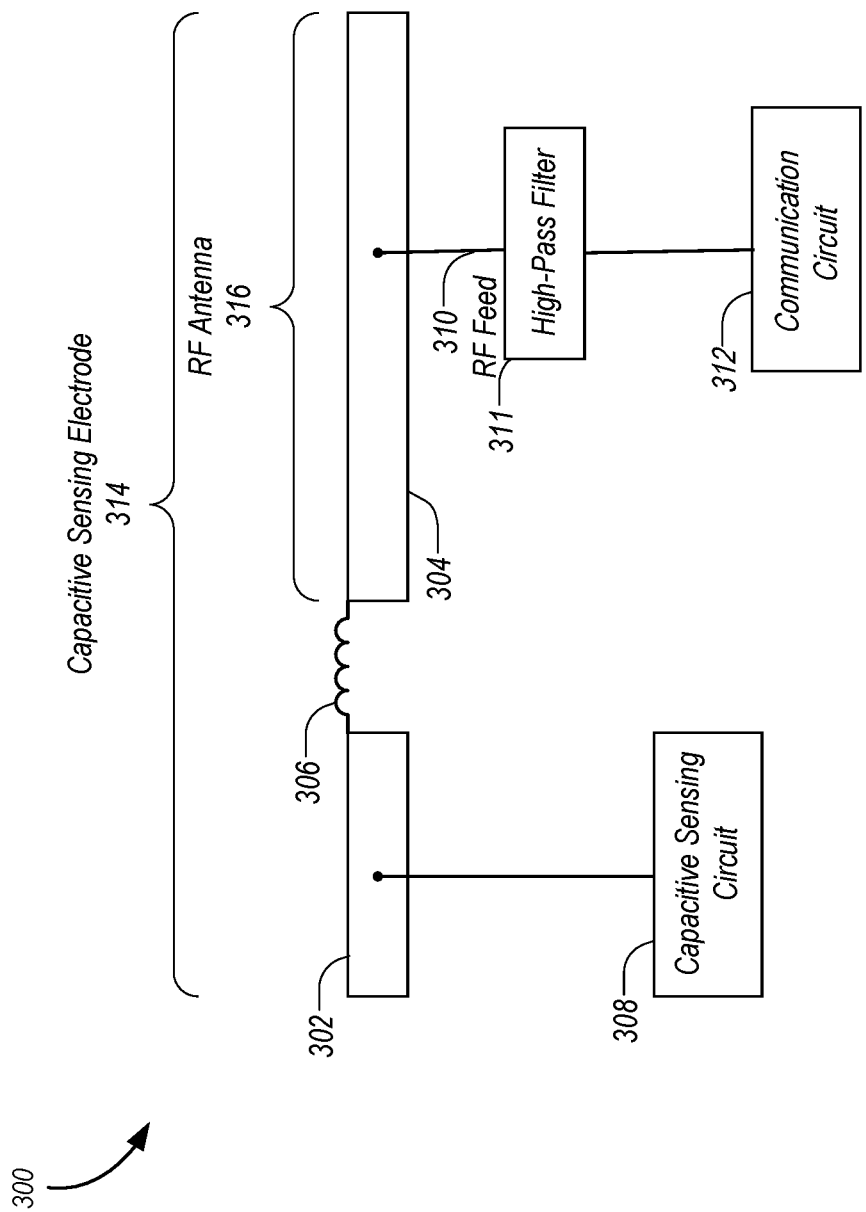

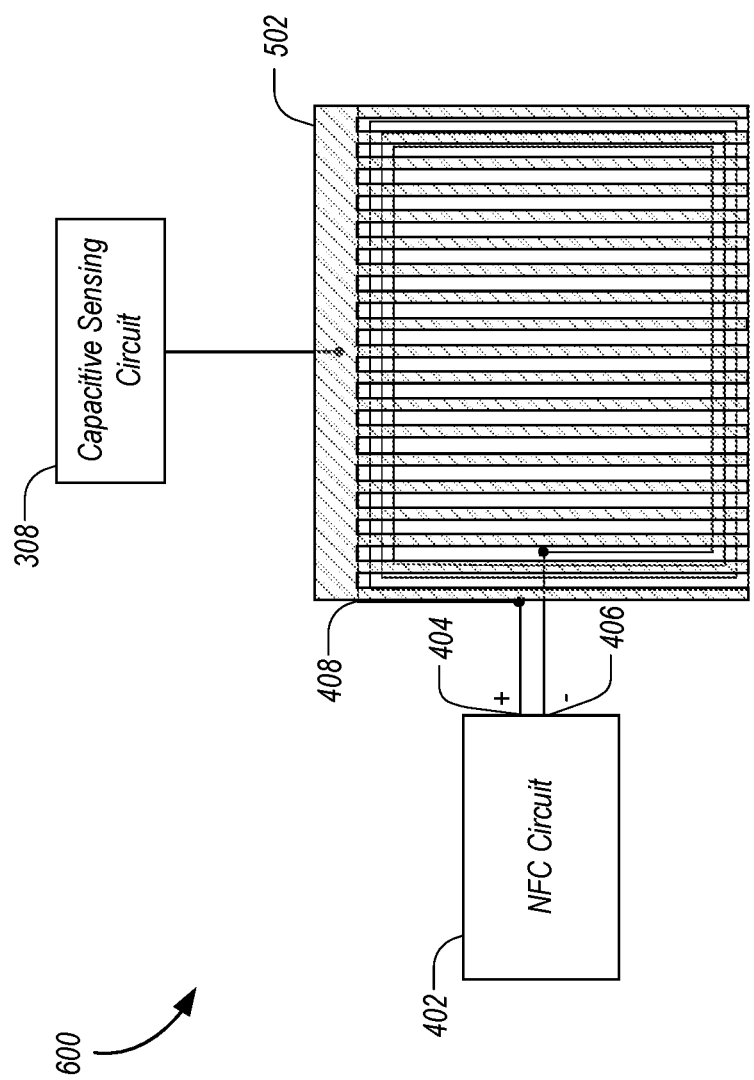

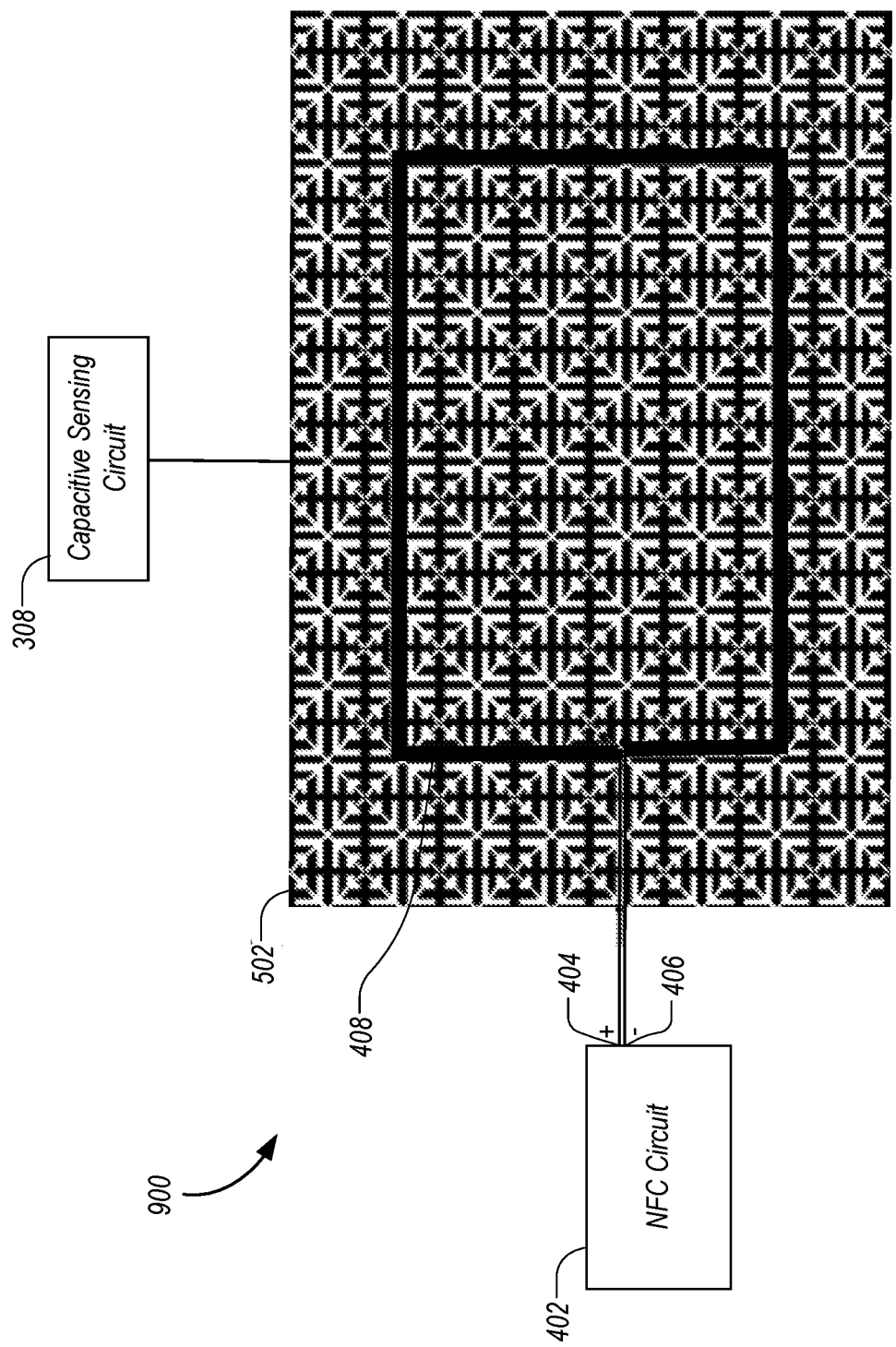

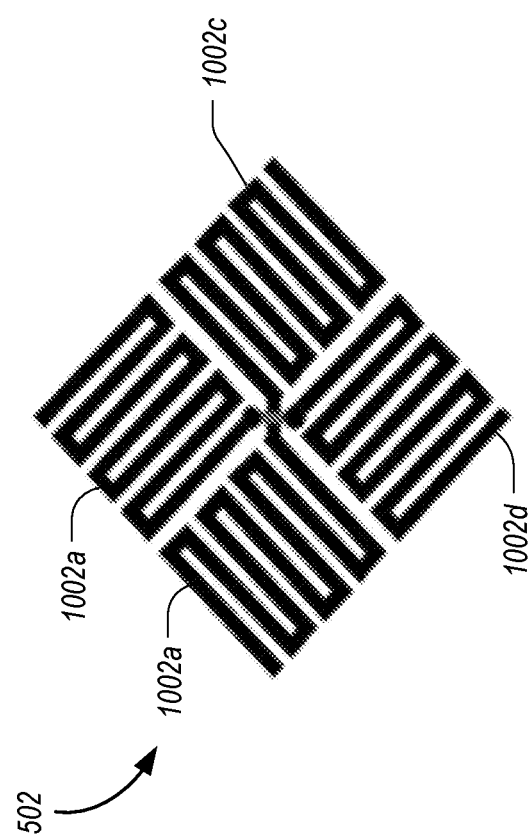

CAPACITIVE TOUCH SENSOR WITH INTEGRATED ANTENNA(S) FOR PLAYBACK DEVICES

CROSS-REFERENCE TO RELATED APPLICATION

This application claims priority to U.S. Provisional Patent Application No. 62/904,266, filed on Sep. 23, 2019, titled "CAPACITIVE TOUCH SENSOR WITH INTEGRATED ANTENNA(S)," which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 3A is a schematic drawing of a touch sensor assembly with an integrated RF antenna assembly in accordance with embodiments of the present technology.

FIG. 10 is a detail view of a portion of a capacitive sensing electrode in accordance with embodiments of the present technology.

Figure 1A:
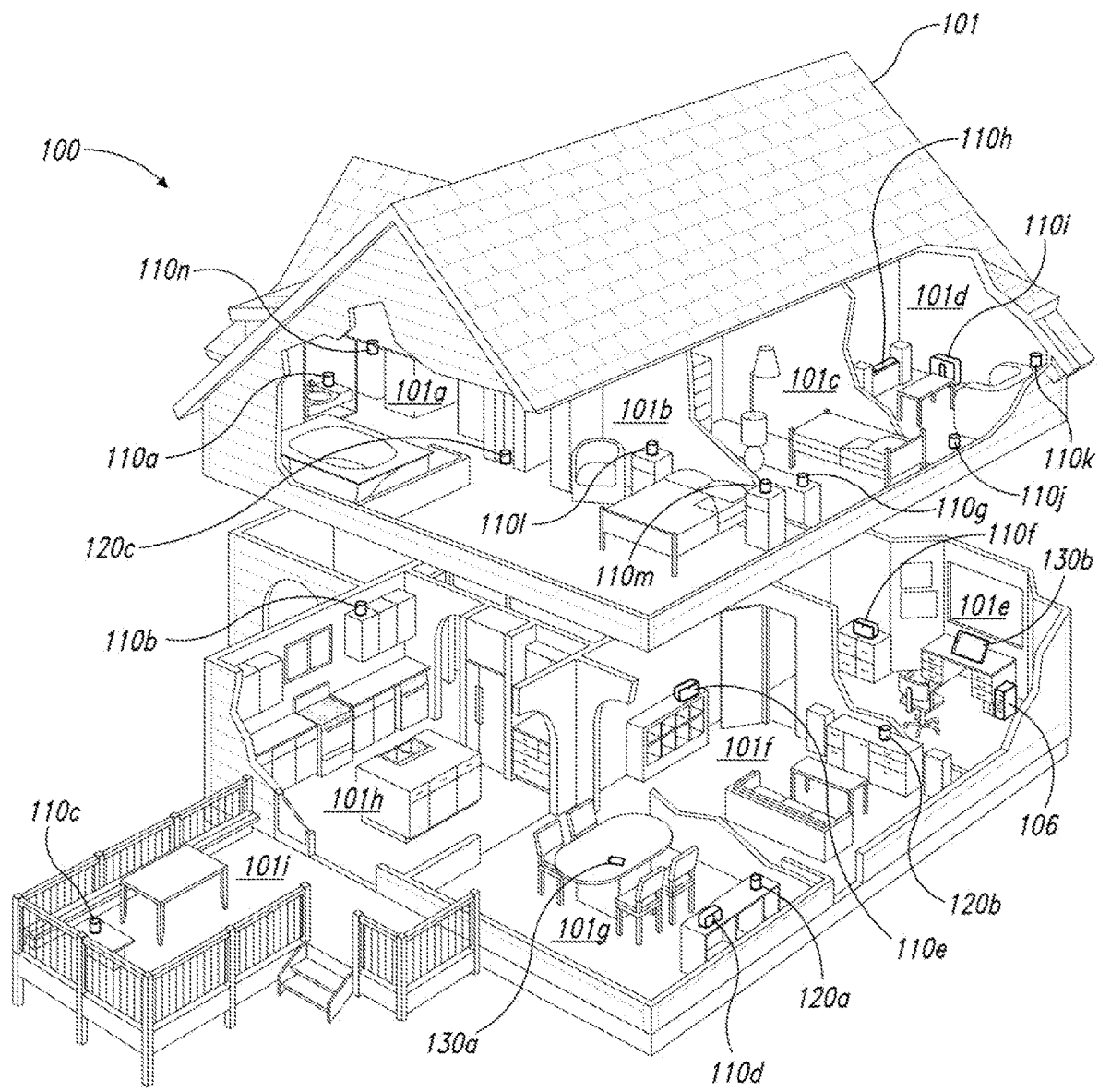
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Many playback devices incorporate a capacitive touch sensor to detect various gestures (e.g., taps, swipes, etc.) on an exterior surface and one or more antennas (e.g., RF antenna(s) and/or near-field communication (NFC) antenna(s)). Typically, the capacitive touch sensor is disposed proximate a surface of the playback device and includes a significant amount of metal to form the capacitive electrodes, shields, etc. As a result, the capacitive touch sensor will significantly interfere with the radiation of an antenna disposed directly underneath the capacitive touch sensor. One approach to this problem is to provide a copper keep-out area in which copper (or other conductive material) is not allowed directly over the antenna(s) to provide a sufficient radiation window for the antennas. Given that the capacitive touch sensor includes conductive material (e.g., to form the electrodes), the size of the capacitive touch sensor must be reduced to accommodate this copper keep-out area. This reduction in size may result in considerable blind spots on the outer surface of the playback device where a user's gestures (e.g., taps) would not be recognized. This also disadvantageously increases the complexity of detecting more sophisticated gestures, such as swipes, because the capacitive touch sensor may only detect a fraction of the swiping motion across a surface. The problem is exacerbated if multiple copper keep-out areas are needed (e.g., one for an RF antenna and another for an NFC antenna). Additionally, in order for a user to differentiate between areas that can receive touch input and those that cannot, external indicia must be provided (e.g., ridges, texturing, or other external indicia that differ between touch-sensitive and non-touch-sensitive portions of the playback device). Particularly in the case of devices having small form factors (e.g., compact smart speakers, headphones, smart glasses, or other wearable devices), it would be beneficial to utilize the greatest amount of available surface area for receiving touch input.

Embodiments of the present technology address these and other shortcomings by providing a touch sensor assembly with one or more integrated and/or co-located antennas. In some embodiments, a touch sensor assembly can include an integrated RF antenna (e.g., a WIFI or BLUETOOTH antenna). For example, a capacitive touch sensor may include a plurality of sensing electrodes. A capacitive sensing circuit applies a low-frequency oscillatory signal (e.g., less than 10 MHz) to the sensing electrodes and detects changes in capacitance indicative of a user's touch. These changes in capacitance can be measured relative to ground (self-capacitance) or relative to other adjacent capacitive sensing electrodes (mutual capacitance). At least one of the electrodes can be configured to function both as a capacitive sensing electrode and as an RF antenna. The RF antenna may be driven with an RF input signal having a comparatively higher frequency relative to the oscillatory signal applied via the capacitive sensing circuit. For example, the RF input signal may have a frequency above about 2 GHz (e.g., 2.4 GHz, 5 GHz, or 6 GHz), while the capacitive sensing signal may have a frequency of less than about 10 MHz (e.g., about 3-4 MHz). As a result, these two signals may co-exist on the same electrode without substantial interference.

One technical problem that arises from attempting to employ a capacitive sensing electrode as an RF antenna is how to control the portion of the capacitive sensing electrode that functions as the RF antenna. For a conductor to function as a radiating element of an antenna, the conductor typically needs to have specific dimensions that are a function of the wavelength of the signal to be transmitted/received. As a result, a portion of the capacitive sensing electrode with particular dimensions (e.g., so as to function as an antenna) should be separated from the remainder of the capacitive sensing electrode.

Given the large frequency difference between the high frequency RF signal and the low-frequency capacitive sensing signal, an inductor (e.g., in the form of an RF choke or other suitable configuration of a low-pass filter) may be employed to block the high-frequency RF signal while passing the low-frequency capacitive sensing signal. For example, a capacitive sensing electrode can include a first conductor and a second conductor with the inductor disposed in series between them. Thus, the inductor may function as a low-pass filter. The particular location of the inductor in the capacitive sensing electrode (and the dimensions of the first conductor and/or second conductor) may define the dimensions of the RF antenna within the capacitive sensing electrode. As a result, an RF antenna may be integrated into a capacitive touch sensing electrode that is an arbitrary size.

Similarly, at least one of the metallic capacitive sensing electrodes may be configured to function as both a capacitive sensing electrode and an NFC antenna. The NFC antenna will be driven by an NFC input signal that is generally at a higher frequency relative to the frequency of the capacitive sensing signal. For example, the NFC input signal may have a frequency of about 14 MHz while the capacitive sensing signal may be less than about 10 MHz (e.g., 3-4 MHz).

In some embodiments, an inductive loop can function as both an NFC antenna (e.g., with a connection to NFC circuitry on either end of the inductive loop) and a capacitive sensing electrode (e.g., with a single connection to a point to a capacitive sensing circuit along the inductive loop). To maintain functionality of the capacitive sensing electrode, the NFC circuit may be isolated with respect to the capacitive sensing circuit. In some embodiments, the NFC circuit is isolated from the capacitive sensing circuit using one or more isolation components (e.g., an isolation circuit including ferrite beads paired with a shunt capacitor or another suitable components) disposed between the NFC circuit and the inductive loop. In some instances, a separate isolation circuit may be unnecessary. For example, if the impedance between the positive and negative terminals of the NFC circuit is sufficiently large within a frequency range relevant to the capacitive sensing circuit, like that of a near-ideal system, the isolation circuit may be removed altogether.

In another aspect of the present technology, an NFC antenna can be co-located with capacitive sensing electrodes without directly integrating the NFC antenna into one of the capacitive sensing electrodes. Conventional capacitive sensing electrodes may tend to block the magnetic flux that is required for NFC to operate, particularly in devices having a high density of capacitive sensing electrodes. Accordingly, the capacitive sensing electrodes may be configured so as to appear more transparent to the NFC antennas (i.e., not block the magnetic flux to the extent of conventional capacitive sensing electrodes). Typically, conventional capacitive sensing electrodes are near-solid shapes (e.g., solid circles, squares, etc.), with a very high density of metallic elements in the touch-input region. In some embodiments of the present technology, these solid shares are replaced with non-solid shapes that have more open space and lower density of metallic components. Such capacitive sensing electrodes permit more magnetic flux to pass, thereby enabling the NFC antenna to inductively couple with an adjacent NFC device.

It should be appreciated that the techniques described herein to integrate and/or co-locate NFC antennas may be extended to integrate and/or co-locate wireless charging coils (e.g., QI coils). For example, a frequency range of a charging signal employed for wireless charging may be non-overlapping with an NFC drive signal, a capacitive sensing signal, and/or an RF input signal. Thus, in some instances, the charging signal may co-exist on the same conductor as one or more of: an NFC drive signal, a capacitive sensing signal, or an RF input signal.

In various embodiments, any number of these features can be implemented separately or combined into a single touch sensor assembly. For example, a touch sensor assembly may include a capacitive touch sensor in conjunction with any one or any combination of the following: an integrated RF antenna, an integrated NFC antenna, an integrated wireless charging coil (e.g., a QI coil), a co-located NFC antenna, and/or a co-located wireless charging coil. While many aspects of the present technology are described herein with respect to headphone devices, the touch sensor assemblies described herein can be beneficially incorporated into other playback and non-playback devices. For example, aspects of the present technology can be used with any device that relies on touch input and also includes at least one antenna for wireless communication.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers typically identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1H.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip-hop music being played back by playback device 110c on the patio 101i. In some aspects, the playback devices 110c and 110f play back the hip-hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
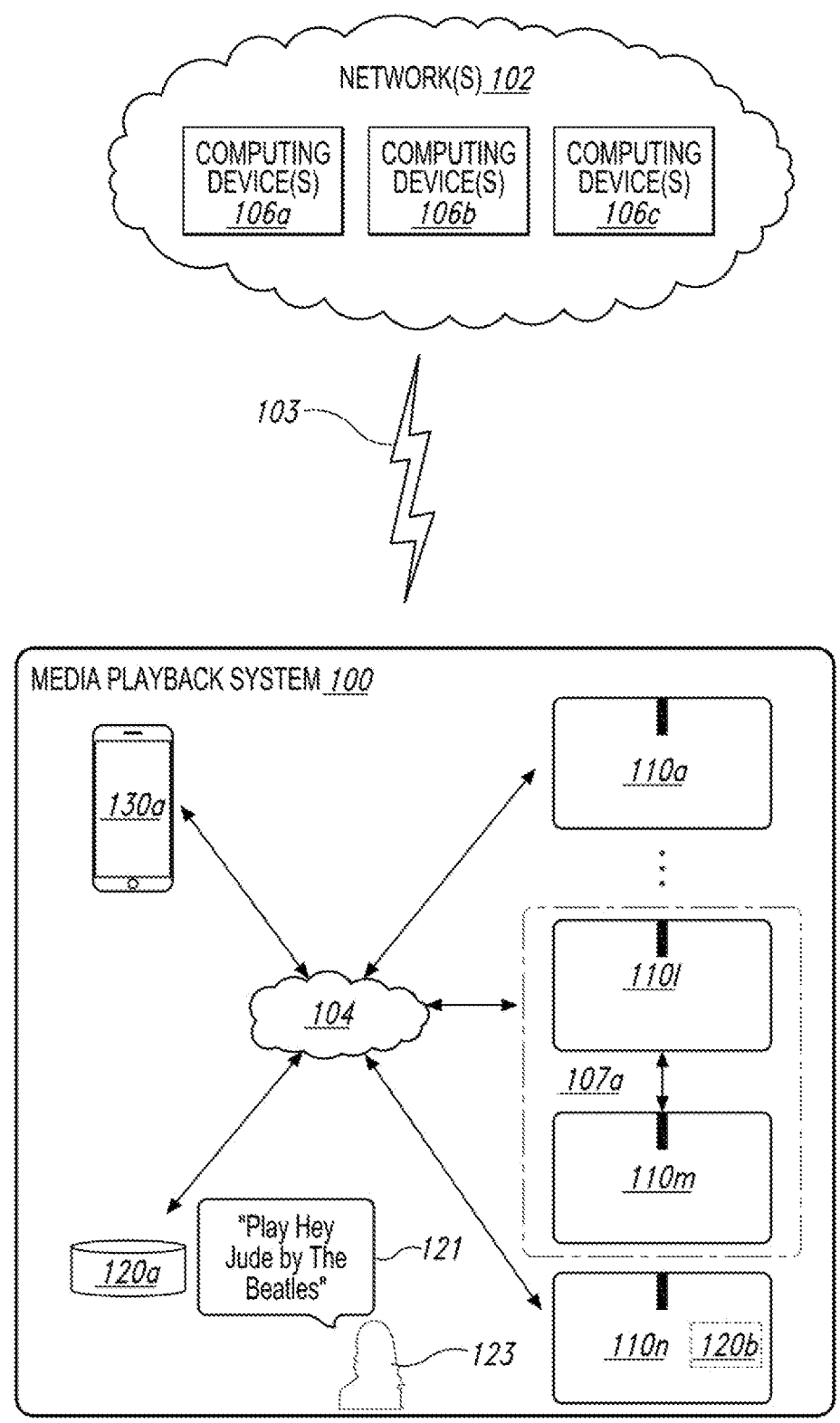
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WIFI network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, 6 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
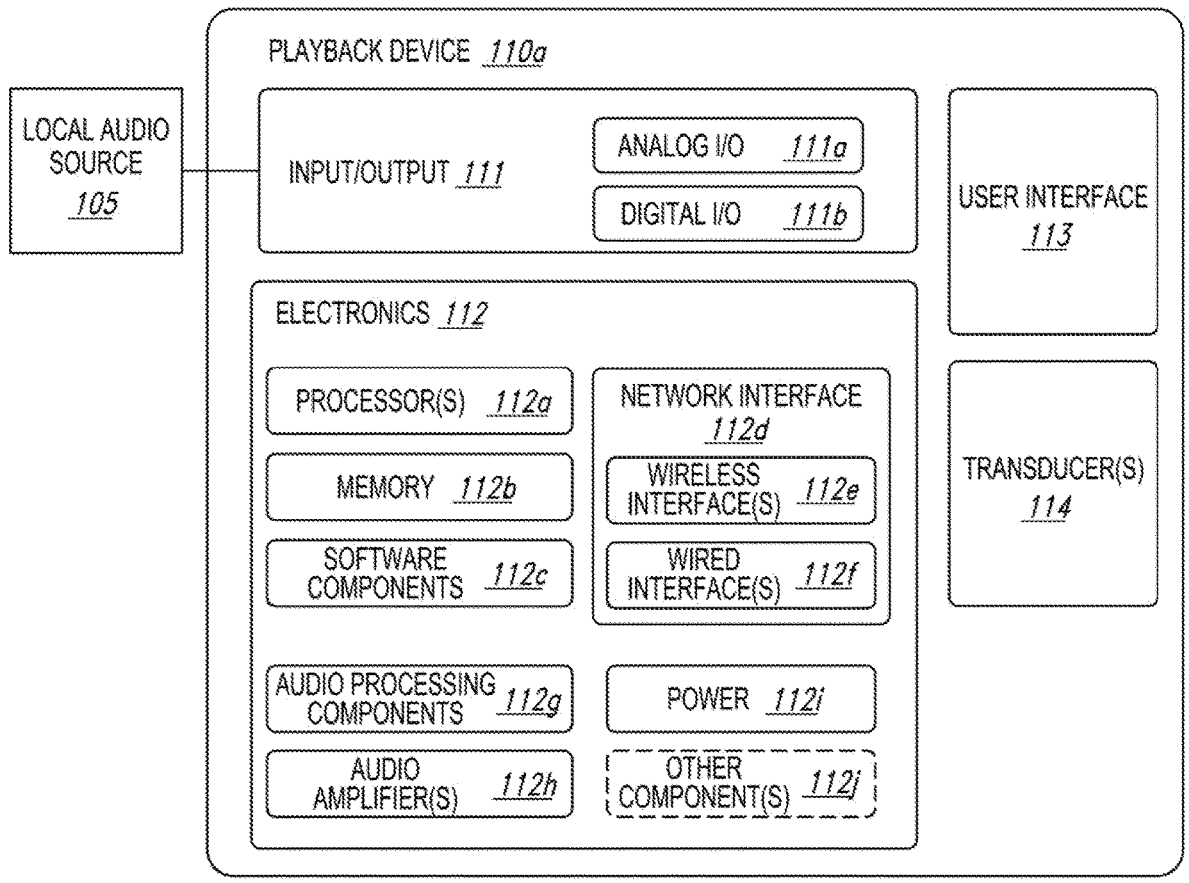
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
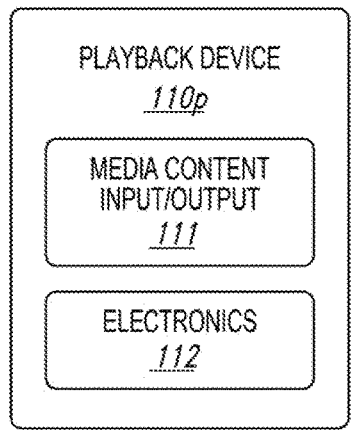
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
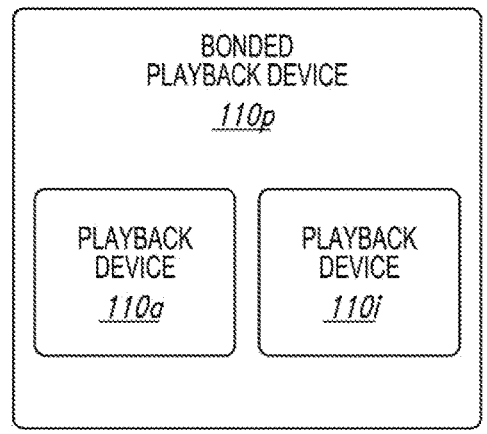
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 112a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Headphone Devices

In some embodiments a playback device may be a headphone device. Aspects of the present disclosure relate to a headphone device (e.g., WIFI enabled headphones, WIFI and BLUETOOTH enabled headphones, etc.) including a touch input and one or more antennas for wireless communication.

Figure 2A:
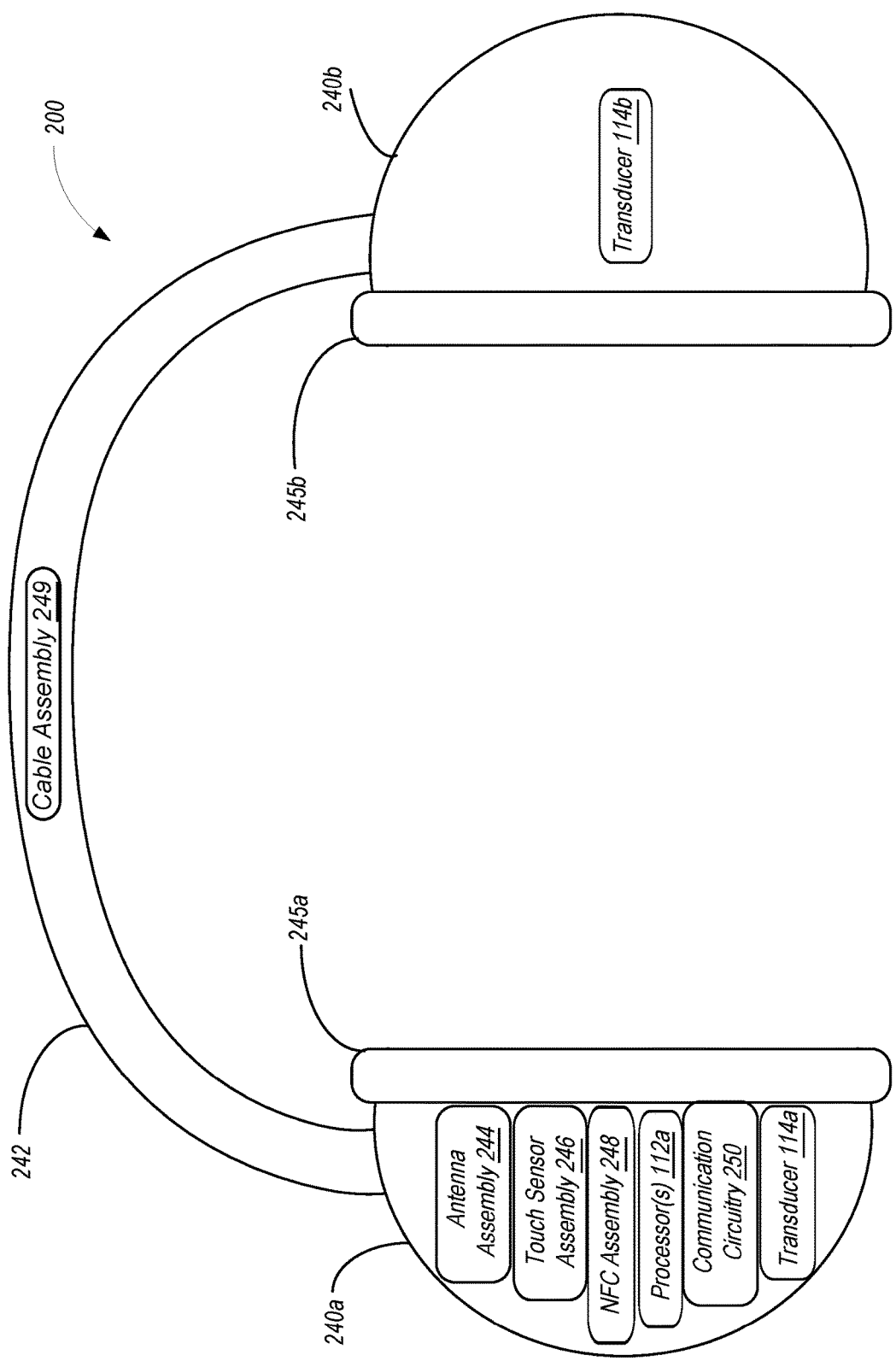
FIG. 2A is a schematic drawing of a headphone device in accordance with embodiments of the present technology.

FIG. 2A shows some aspects of an example headphone device 200 according to some embodiments. The headphone device 200 may be implemented as a wearable device such as over-ear headphones, in-ear headphones, or on-ear headphones. As shown, the headphone device 200 includes a headband 242 that couples a first earpiece 240a to a second earpiece 240b. Each of the earpieces 240a and 240b may house any portion of the electronic components in the headphone device 200 (e.g., transducers 114a and 114b, amplifiers, filters, processor(s) 112a, memory, receivers, transmitters, switches, etc.). Additionally, one or both of the earpieces 240a and 240b may house an antenna assembly 244, a touch sensor assembly 246, a near-field communication (NFC) assembly 248, and/or communication circuitry 250. The touch sensor assembly 246 can include a capacitive touch sensor configured to receive user input for playback control and other operation of the headphones 200. Detailed example embodiments of the touch sensor assembly 246, the antenna assembly 244, and the NFC assembly 248 are provided in FIGS. 3-10. In some example embodiments, one or more of the earpieces 240a and 240b may further include additional user interface components for controlling audio playback, volume level, and other functions, for example, buttons, switches, microphones for voice input, etc. In some embodiments, the collection of above-listed components are said be enclosed within a headphone housing, which includes the combination of the first and second earpieces 240a, 240b and the headband 242.

Although the illustrated embodiment shows several components housed within the first earpiece 240a (e.g., the antenna assembly 244, touch sensor assembly 246, NFC assembly 248, processor(s) 112a, and communication circuitry 250), in various embodiments some of all of these components can be housed in the other earpiece 240b. In some embodiments, some or all of these components can be duplicated in the second earpiece 240b, such that each of the first and second earpieces 240a and 240b have, for example, an antenna assembly 244, a touch sensor assembly 246, an NFC assembly 248, a processor 112a, and/or communication circuitry 250.

As shown in FIG. 2A, the headphone device 200 may further include ear cushions 245a and 245b that are coupled to earpieces 240a and 240b, respectively. The ear cushions 245a and 245b may provide a soft barrier between the head of a user and the earpieces 240a and 240b, respectively, to improve user comfort and/or provide acoustic isolation from the surrounding environment (e.g., passive noise reduction (PNR)).

In some embodiments, the communication circuitry 250 may comprise any of a variety of electronic components that enable transmission and/or receipt of wireless signals via the antenna assembly 244. Examples of such components include receivers, transmitters, processors 112a, memory, amplifiers, switches, and/or filters. The antenna assembly 244 can include one or more antennas configured to communicate over one or more wireless networks. Example wireless networks include: a WIFI network, a BLUETOOTH network, an LTE network, a Z-Wave network, a 5G network, and a ZIGBEE network.

In some embodiments, the antenna assembly 244 includes one or more multi-band antennas configured to operate on several frequency bands (e.g., two or more of: the 2.4 GHz band, the 5 GHz band, or the 6 GHz band), such as a dual-band inverted-F antenna (IFA). Further, in some examples, one or more antennas of the assembly 244 may be passive multi-band antennas, active multi-band antennas, or a combination thereof. In some embodiments, the antenna assembly 244 can include a single-band antenna configured to operate on a single frequency band (e.g., one of: the 2.4 GHz band, the 5 GHz band, or the 6 GHz band).

It should be appreciated that the headphone device 200 may employ any number of antennas and is not limited to implementations with any particular number of antennas. For example, the headphone device 200 may comprise two antennas for communication over WIFI and a third antenna for communication over BLUETOOTH. Additionally (or alternatively), the headphone device 200 may comprise an additional antenna to enable near-field communication, for example as part of the NFC assembly 248.

The communication circuitry 250 is further configured to cause the headphone device 200 to wirelessly communicate with at least one external device, such as a control device 130 or other network device, based at least in part on the current mode of operation. The control device 130 may be, for example, a smartphone, tablet, computer, etc.

In some embodiments, the headphone device 200 may be configured to operate in various operational modes dependent upon media-type and/or synchronized devices (e.g., music, home theater, etc.). For example, one mode may be a synchronized playback mode where headphone device 200 plays back audio content that is synchronized with playback of content output by another device. In one example, the synchronized playback mode includes a first headphone device playing back audio that is synchronized with a television set's playback of video corresponding to the audio that the first headphone device is playing back. In some embodiments, the audio may be home theater or surround sound audio. In another example, the synchronized playback mode includes the first headphone device playing back audio that is synchronized with a second headphone device's playback of the same audio that the first headphone device is playing. In yet another example, the synchronized playback mode includes the first playback device playing back audio that is synchronized with both (i) a television set's playback of video corresponding to the audio that the first headphone device is playing back and (ii) a second headphone device's playback of the same audio that the first headphone device is playing. Another mode may be a non-synchronized playback mode where the first headphone device plays back audio content that is not synchronized with content output by other devices (e.g., headphone device 200 playing only audio content without synchronization to other devices).

Additionally or alternatively, operating in a synchronized playback mode, such as a home theater mode, may involve pairing the headphone device 200 with other playback devices described herein. In these examples, the headphone device 200 may, for example, be grouped in a playback zone. An example playback scheme may involve muting the other playback devices in the playback zone while the headphone device 200 is paired. For example, when the headphone device 200 is paired in a playback zone with a home theater system comprising multiple playback devices (e.g., a sound bar, a subwoofer, and a plurality of satellite speakers), the other multiple playback devices may not play back home theater audio while the headphones are paired with the playback zone and playing back the home theater audio. In operation, the other multiple playback devices may mute their playback of the home theater audio, or alternatively, a home theater controller (e.g., a soundbar, surround sound processor, or other device configured to coordinate surround sound playback of the home theater audio among the multiple playback devices) may simply not transmit or otherwise provide the home theater audio information to the multiple playback devices for playback while the headphone is paired in the playback zone and configured to playback the home theater audio. In some embodiments, the surround sound controller transmits or otherwise provides the home theater audio to the headphones and coordinates the headphone's synchronized playback of the home theater audio with the play back of the home theater audio's corresponding video by the television or other display screen.

Further, in some examples, multiple headphone devices 200 may be paired in the playback zone. In these examples, a playback scheme may involve outputting audio content only on the paired headphone devices 200 and muting the remaining playback devices in the playback zone. For example, when a first headphone device and a second headphone device are both paired in the playback zone with the home theater system comprising the multiple playback devices (e.g., the sound bar, subwoofer, and plurality of satellite speakers), the other multiple playback devices may not play back the home theater audio while the first and second headphones are paired with the playback zone and playing back the home theater audio. As described above, the other multiple playback devices may mute their playback of the home theater audio, or alternatively, the home theater controller may simply not transmit or otherwise provide the home theater audio information to the multiple playback devices for playback while the first and second headphones are paired in the playback zone and configured to playback the home theater audio. In some embodiments where multiple headphones are paired with the playback zone, the surround sound controller transmits or otherwise provides the home theater audio to the first and second headphones and coordinates the synchronized playback of the home theater audio by the first and second headphones with each other and with the play back of the home theater audio's corresponding video by the television or other display screen.

In the embodiment shown in FIG. 2A, the first transducer 114a and the communication circuitry 250 are in the first earpiece 240a and the second transducer 114b is in the second earpiece 240b. To connect the first transducer 114b in the second earpiece 240b with components in the first earpiece 240a, the headband includes a cable assembly 249 that connects circuitry disposed within the second earpiece 240b to circuitry disposed within the second earpiece 240b). The cable assembly 249 may be constructed as, for example, a set of one or more cables that couple (e.g., electrically couple) one or more components at least partially housed by the first earpiece 240a with one or more components at least partially housed by the second earpiece 240b. In embodiments in which a second antenna assembly is disposed in the second earpiece 240b, the cable assembly 249 connects the second antenna in the second earpiece 240b with the communication circuitry 250 in the first earpiece 240a.

The cable assembly 249 may be constructed as, for example, a set of one or more cables (e.g., a set of one or more flexible cables), for example a coaxial cable. In such embodiments, the coaxial cable may comprise any combination of the following: (1) one or more inner conductors; (2) one or more insulators at least partially disposed around the one or more inner conductors; (3) one or more metallic shields at least partially disposed around the one or more insulators; and (4) a jacket at least partially disposed around the one or more metallic shields. Although coaxial cables are advantageous because of durability, low noise, and ease of manufacture and implementation for the example headphone configuration(s) described herein, the cable assembly 249 may comprise other types of cables in place of the coaxial cable or in combination with the coaxial cable. For example, in some embodiments, the cable assembly 249 may comprise a triaxial cable, a ribbon cable, or any other cable configuration suitable for connecting circuitry in the second earpiece 240b with circuitry in the first earpiece 240a.

In some example embodiments, the headphone device 200 may further include one or microphones, such as microphones 115 (FIG. 1F). The microphones 115 may be disposed within one or both earpieces 240a and 240b. Further, when equipped with the microphones 115, headphone device 200 can operate as an NMD configured to receive voice input from a user and correspondingly perform one or more operations based on the received voice input. Additionally or alternatively, the microphones 115 may be used for active noise cancellation (ANC) and/or active noise reduction (ANR).

Figure 2B:
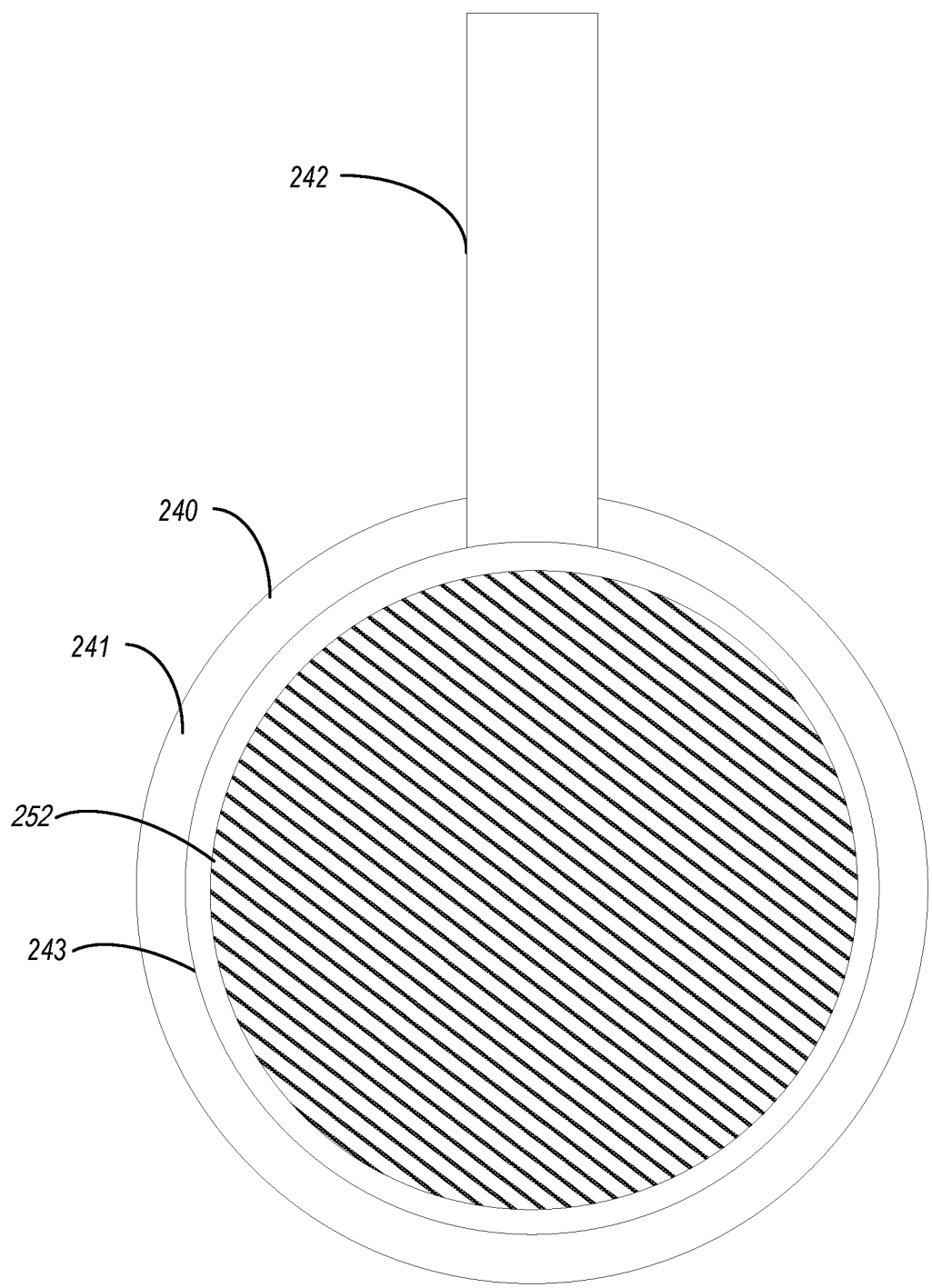
FIG. 2B is a schematic drawing of a headphone device in accordance with embodiments of the present technology.

Referring to FIG. 2B, in some embodiments the earpieces 240a and 240b may include a first member 243 attached to the headband 242 and a second member 241 that pivots relative to the first member 243. In these examples, the ear cushions 245a and 245b may be disposed, for example, on the second member 241, closer to the user/wearer's head. Any of the circuitry and electrical components described herein may be disposed in either the first member 243 or the second member 241. For example, the antenna assembly 244 may be disposed in the first member 243.

As seen in FIG. 2B, the earpiece 240 can include a touch-sensitive input area 252 disposed over a laterally outward surface of the earpiece 240. As described in more detail below, this touch-sensitive input area 252 can be part of the touch sensor assembly 242, and configured to detect a user's touch via a capacitive sensing circuit or other proximity sensing technique. In some embodiments, the touch-sensitive input area 252 is positioned laterally outward with respect to the other electronic components to facilitate detection of the user's touch without the interference of any intervening components. However, because such touch-sensitive input areas 252 typically include relatively large areas of conductive metals, they can often interfere with wireless transmission of any underlying antennas (e.g., those of the antenna assembly 242 or NFC assembly 248). As discussed below with respect to FIGS. 3A-10, in some embodiments the touch sensor assembly 242 can be configured to integrate an antenna and/or an NFC assembly into the capacitive sensing electrodes, thereby providing a large touch-sensitive input area 252 while maintaining wireless transmission from antennas disposed within the earpiece 240.

In some embodiments, the antenna assembly 244 can employ a metal accent on the exterior of the earpiece 240 as a ground plane for the antenna. The ground plane may, for example, be a conductor that is large relative to the wavelength of the transmitted electromagnetic waves for performing the grounding function. It should be appreciated that other pieces of metal within the earpieces 240a and/or 240b may also be employed as a ground plane for the antenna assembly 244. For example, the earpieces 240a and/or 240b may house a metal heatsink to cool one or more electronic components. In this example, the heatsink may be employed as a ground plane for the antenna assembly 244.

It should be appreciated that, in some instances, the headphone devices described herein may be implemented as a hearable device. Hearable devices may include those headphone devices that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.).

IV. Example Touch Sensor Assemblies with Integrated Antenna(s)

FIGS. 3A-10 show example touch sensor assemblies (shown as assemblies 300, 350, 400, 500, 600, 700, 800, and 900 in FIGS. 3A, 3B, 4, 5, 6, 7, 8, and 9, respectively). The touch sensor assemblies may be implemented in, for example, any of a variety of network devices. In some embodiments, the touch sensor assemblies can be incorporated into a playback device having a housing configured to be worn about a portion of the subject, for example the headphones 200 or other wearable devices (e.g., smart glasses, a smartwatch, etc.). The touch sensor assemblies can be configured to provide a touch input surface on an exterior portion of the device, for example on the laterally outward surface of an earpiece in the case of headphones. This touch input surface may comprise one or more capacitive touch buttons and/or one or more capacitive touch pads. For example, a first portion of the touch input surface may comprise one or more capacitive touch buttons and a second portion (e.g., that does not overlap with the first portion) of the touch surface may comprise one or more capacitive touch pads.

In various embodiments, the touch sensor assemblies can be configured to receive one or more different types of user input. For example, touch sensor assembly can be configured to operate as a button (e.g., detecting a user's touch in a binary fashion), a slider (e.g., detecting movement of a user's finger across a single axis), a trackpad (e.g., detecting a user's touch at multiple points over a 2-dimensional area), or any combination thereof. Additionally or alternatively, the capacitive sensing techniques employed can vary in different embodiments. For example, the touch sensor assembly can rely on self capacitance, mutual capacitance, or a hybrid approach that combines self capacitive and mutual capacitance. As described in more detail below, in various embodiments the touch sensor assembly includes an antenna (e.g., an RF antenna), a near-field communication (NFC) loop, and/or a wireless charging loop. The particular configuration and construction of these antennas, NFC loops, and wireless charging loops can vary in different embodiments. For example, the touch sensor assemblies disclosed herein can have one or more antennas of the following types: monopole antennas, dipole antennas, aperture antennas (e.g., slot or loop antennas), microstrip antennas, patch antennas, inverted F antennas (IFAs) such as planar inverted F antennas (PIFA), traveling wave antennas, spiral antennas, inductive loops, or any other suitable antenna.

Figure 3B:
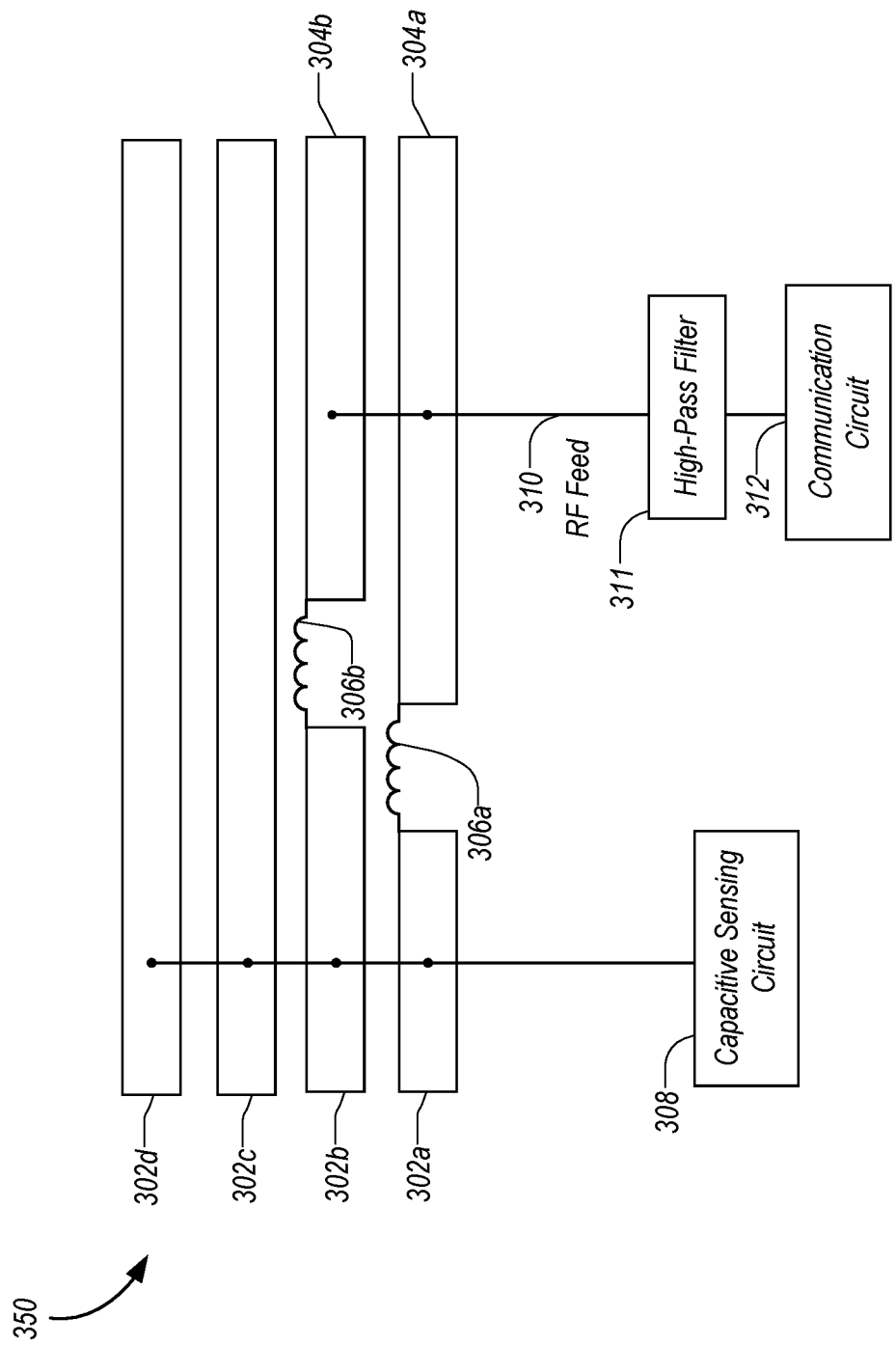
FIG. 3B is a schematic drawing of another embodiment of a touch sensor assembly with an integrated RF antenna assembly.

FIGS. 3A and 3B illustrate examples of a touch sensor assembly with an integrated RF antenna assembly. As noted previously, it can be useful to configure one or more electrodes of a touch sensor assembly to operate both as (i) a capacitive sensing electrode in communication with a capacitive sensing circuit and (ii) an RF antenna (e.g., a WIFI or BLUETOOTH antenna) in communication with an RF feed. The resulting configuration provides for improved wireless communication via the RF antenna without sacrificing surface area to receive touch input from a user. Such a dual-use electrode can be formed of two conductors with a filter (e.g., a low-pass filter) disposed in series between them.

For example, as shown in FIG. 3A, the touch sensor assembly 300 includes a first conductor 302 and a second conductor 304, with a filter 306 disposed in series between them. The conductors 302 and 304 can be metallic components, for example made of copper or other suitable conductive materials. A capacitive sensing circuit 308 is coupled to the first conductor and configured to deliver a capacitive sensing signal to the first conductor 302. The capacitive sensing signal can be a relatively low-frequency oscillatory signal, for example having a frequency of less than about 10 MHz (e.g., between about 1-10 MHz, between about 2-5 MHz, or between about 3-4 MHz). The capacitive sensing circuit 308 additionally detects changes in capacitance indicative of a user's skin (e.g., a fingertip) coming into proximity with the first or second conductors 302, 304. The capacitive sensing circuit 308 may be integrated into, for example, a system-on-a-chip (SoC) such as a programmable system-on-a-chip (PSoC).

An RF feed 310 is coupled to the second conductor 304. The RF feed 310 is configured to provide an RF input signal to the second conductor 304. The RF input signal can be a relatively high frequency signal, for example having a frequency of greater than about 2 GHz (e.g., between about 1-10 GHz, between about 2-6 GHz, about 2.4 GHz, about 5 GHz, about 6 GHz). The RF input signal may be associated with any of a variety of wireless communication standards including, for example, BLUETOOTH, 2.4 GHz WIFI, 5.0 GHz WIFI, LTE, 5G, or any combination thereof. The RF input signal may be generated by, for example, a wireless transceiver in suitable communication circuit 312.

In some embodiments, the RF feed 310 may be implemented as one or more coaxial cables each comprising a center conductor and an outer shield. In these embodiments, the RF input signal may be carried by the center conductor and the outer shield may be coupled to RF ground. It should be appreciated that the RF feed 310 may be implemented using other types of cables and/or other elements separate and apart from cables (e.g., conductive traces on a circuit board, etc.).

The filter 306 disposed between the first conductor 302 and the second conductor 304 may comprise an inductor (e.g., an RF choke) or other component(s) configured to operate as a low-pass filter. For example, the filter 306 can be configured to substantially pass the low-frequency capacitive sensing signals (e.g., attenuate such signals by less than about 0.5 dB) and to substantially block the high-frequency RF input signals (e.g., attenuate such signals by greater than about 10 dB). As a result, the low-frequency capacitive sensing signals propagate through the first and second conductors substantially unobstructed. Together these components form the capacitive sensing electrode 314. Meanwhile, the high-frequency RF input signal provided to the second conductor 304 is substantially blocked via the filter 306 from reaching the first conductor 302. As a result, the second conductor 304 itself forms the RF antenna 316. By selecting the dimensions of the second conductor 304 and/or the filter 306, the second conductor 304 can operate as the RF antenna 316 while also serving as a portion of the capacitive sensing electrode 314. In some embodiments, the dimensions of the second conductor 304 are configured such that the second conductor 304 operates as a quarter-wavelength radiator. Because the RF antenna 316 is disposed in the same plane as the capacitive sensing electrode 314, the capacitive sensing electrode 314 does not significantly interfere with or attenuate the signal radiated by the RF antenna 316. In some embodiments, the second conductor 304 may be coupled to RF ground (e.g., via a conductive element such as an outer shield in a coaxial cable) and form at least a portion of an inverted-F antenna or other suitable antenna configuration. The second conductor 304 may be, for example, AC coupled to RF ground (e.g., using one or more circuit elements that block low-frequency signals). In other embodiments, the second conductor 304 may not be directly coupled to RF ground.

In some embodiments, the touch assembly 300 may comprise one or more filters disposed between the second conductor 304 and the communication circuit 312 to isolate the communication circuit 312 from the low-frequency signals from the capacitive sensing circuit 308. For example, a high-pass filter 311 can be disposed between the second conductor 304 and the communication circuit 312. In operation, the high-pass filter 311 permits the high-frequency signals from the communication circuit 312 to pass to the second conductor 304 while low-frequency signals from the capacitive sensing circuit 308 (e.g., those that pass from the first conductor 302, across the filter 306, and to the second conductor 304) are substantially blocked by the high-pass filter 311. The high-pass filter 311 can be any suitable component or combination of components (e.g., one or more capacitive or inductive elements) configured to block or substantially block low-frequency signals from passing therethrough. In some embodiments, the high-pass filter 311 can be omitted altogether.

In some embodiments, the communication circuit 312 and the capacitive sensing circuit 308 may share a common ground and/or have a connection to a common ground. For example, the communication circuit 312 and/or the RF antenna 316 may be coupled to an RF ground that is, in turn, coupled to a common ground that the capacitive sensing circuit 308 is also coupled to. In such a design, the RF antenna 316 (and/or communication circuit 312) may be AC coupled to ground such that the capacitive sensing circuit 308 doesn't see a direct path to ground at the low-frequencies used for capacitive sensing. The AC coupling to ground may be achieved by, for example, one or more filters (e.g., high-pass filter 311) that present a high-impedance at low frequencies (e.g., block low frequency signals). Thus, in some embodiments, the RF antenna 316 may be AC coupled to a wireless transceiver in the communication circuit 312 and/or AC coupled to ground (e.g., RF ground).

FIG. 3B illustrates another embodiment of a touch sensor assembly 350 having an integrated RF antenna. Several components can be similar to those described above with respect to FIG. 3A. In the embodiment of FIG. 3B, however, there a plurality of conductors 302a-d, each of which are coupled to the capacitive sensing circuit 308. Although only rows of conductors 302a-d are illustrated, in some embodiments the capacitive sensing circuit can 308 can be coupled to an array of column and grid electrodes. As shown in FIG. 3B, the first conductor 302a is coupled in series to the second conductor 304b via a filter 306a, similar to the configuration described above with respect to FIG. 3A. As a result, the second conductor 304b forms a first RF antenna. A third conductor 302b is coupled in series with a fourth conductor 304b via a second filter 306b. The relative dimensions of the third conductor 302b and the fourth conductors 304b here are different as compared to the dimensions of first conductor 302a and second conductor 302b. As a result, the second RF antenna, which is formed by the fourth conductor 304b, can be configured to radiate at a different frequency or range of frequencies than the first RF antenna formed by the second conductor 304a. For example, the first RF antenna can be configured for 5 GHz WIFI transmission (e.g., about 5 GHz) and the second RF antenna can be configured for BLUETOOTH transmission (e.g., about 2.45 GHz). In other embodiments, multiple RF antennas can be provided with similar dimensions and configurations. This principle can be extended to any number of RF antennas, each of which can be tailored by varying the dimensions and configurations of the conductors 304 and the filters 306. The fifth and sixth conductors 302c and 302d, respectively, may only function as capacitive touch electrodes (e.g., not operate as RF antennas). Accordingly, the touch sensor assembly 350 may, in some embodiments, comprise a plurality of capacitive sensing electrodes including a first subset of the capacitive sensing electrodes that function as both capacitive sensing electrodes and RF antennas and a second subset of the capacitive sensing electrodes that function as only capacitive sensing electrodes.

It should be appreciated that the particular connections between the capacitive sensing circuit 308 and the conductors 302a, 302b, 302c, and 302d may vary based on the particular implementation. For example, the capacitive sensing circuit 308 may have a separate connection to each of the conductors 302a, 302b, 302c, and 302d or any subset thereof and/or the capacitive sensing circuit 308 may have a shared connection to the conductors 302a, 302b, 302c, and 302d or any subset thereof. Similarly, the particular connections between the communication circuit 312 and the conductors 304a and 304b may vary based on the particular implementation. For example, the communication circuit 312 may have a separate connection to each of the conductors 304a and 304b and/or the communication circuit 312 may have a shared connection to the conductors 304a and 304b.

Figure 4:
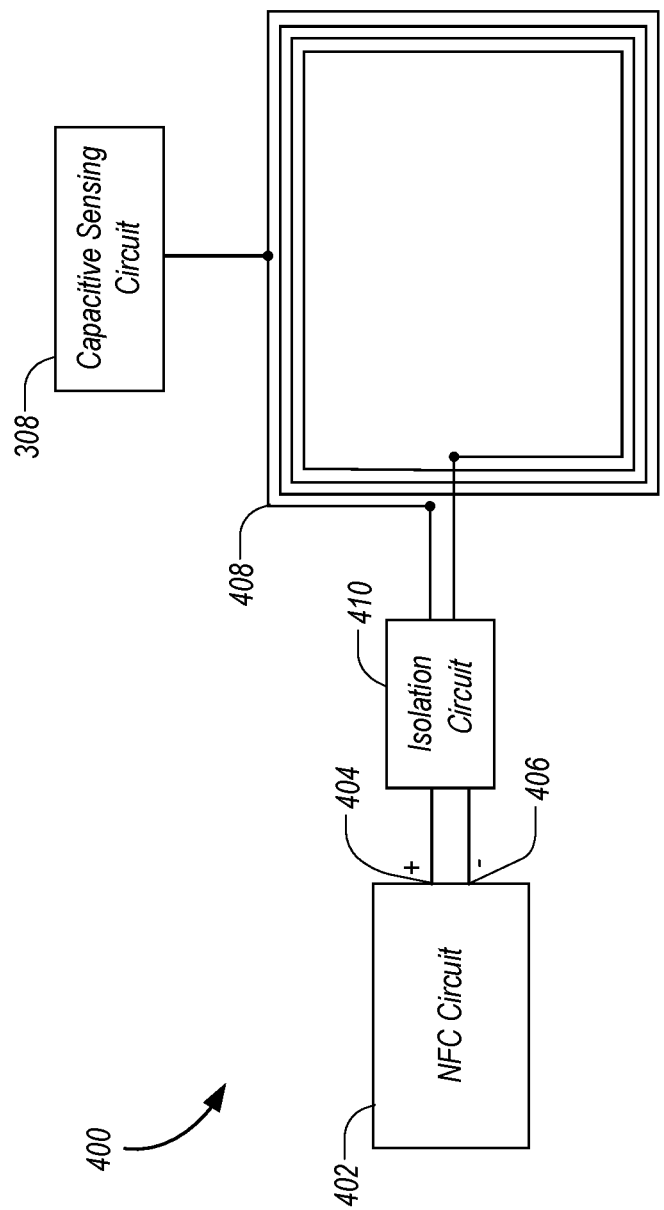
FIG. 4 is a schematic drawing of a touch sensor assembly with an integrated near-field communication (NFC) assembly in accordance with embodiments of the present technology.

FIG. 4 illustrates an example of a touch sensor assembly 400 having an integrated NFC assembly. As shown in FIG. 4, an NFC antenna can take the form of an inductive loop 408 configured to inductively couple with a corresponding NFC antenna on a paired device. The inductive loop 408 can be, for example, a metallic conductor that coils around a central region. An NFC circuit 402 can be electrically coupled to the inductive loop 408 via both positive and negative terminals 404, 406. The NFC circuit 402 is configured to provide a drive signal to the inductive loop 408 for inductively coupling with another NFC device, and optionally to detect current induced in the inductive loop 408 from another inductively coupled NFC device. In some embodiments, the drive signal provided by the NFC circuit 402 can be relatively high frequency, for example having a frequency of between about 10-20 MHz, or between about 12-15 MHZ.

A capacitive sensing circuit 308 is coupled to the inductive loop 408 (e.g., at a single point) such that the inductive loop 408 also operates as a capacitive sensing electrode. The capacitive sensing circuit 308 can provide a capacitive sensing signal to the inductive loop 408 (e.g., a low-frequency oscillatory signal as described previously) and detects changes in capacitance (e.g., due to proximity of a user's finger to the inductive loop 408). To minimize or reduce interference with operation of the capacitive sensing circuit 308, the NFC circuit 402 can be isolated with respect to the inductive loop 408 via an isolation circuit 410 disposed between the NFC circuit 402 and the inductive loop 408. The isolation circuit 410 can function as a high-pass filter, substantially passing the relatively high frequency drive signal from the NFC circuit 402 to the inductive loop 408 (e.g., attenuating the drive signal by less than about 0.5 dB) and substantially blocking the relatively low-frequency capacitive sensing signal supplied by the capacitive sensing circuit 308 from reaching the NFC circuit 402 (e.g., by attenuating the capacitive sensing signal by more than about 10 dB). Further, the isolation circuit presents a high impedance (e.g., an open circuit) to the capacitive sensing circuit 308 between the ends of the inductive loop 408. The isolation circuit 410 can take a number of different forms. In one example, two ferrite beads and a shunt capacitor are used to isolate the NFC circuit 402 with respect to the capacitive sensing circuit 308. In some embodiments, the impedance between the positive and negative terminals 404, 406 of the NFC circuit 402 may be sufficiently high that the isolation circuit 410 can be omitted entirely.

FIGS. 5-9 illustrate examples of touch sensor assemblies having a co-located NFC assembly. In these embodiments, an NFC antenna (e.g., an inductive loop 408) is co-located with a capacitive touch sensor assembly in a manner that maintains the ability of magnetic flux generated by the NFC antenna 408 to propagate without excessive attenuation caused by capacitive sensing electrodes 502. For example, while conventional capacitive sensing electrodes are relatively high in density (e.g., the electrodes cover a large portion of the area of the capacitive touch sensor), in some embodiments the capacitive sensing electrodes 502 can be arranged to provide more transparency to the magnetic flux generated by the NFC antenna 408. In addition to providing increased transparency, the electrodes 502 can be configured to reduce or minimize eddy currents that may be induced in the electrodes when magnetic flux generated by the NFC antenna 408 propagates therethrough. For example, by reducing or eliminating the presence of wide traces or loops within the sensing electrodes 502, the magnetic flux generated by the NFC antenna 408 may be less likely to generate eddy currents within the sensing electrodes 502. As such eddy currents can interfere with operation of the capacitive sensing circuit 308, this design of the sensing electrodes 502 can improve operation of the touch sensor assembly.

In various embodiments, the inductive loop 408 forming the NFC antenna can be in the same plane as the capacitive sensing electrodes 502 (e.g., circumscribing an area in which the capacitive sensing electrodes 502 are positioned), or the inductive loop 408 can be positioned partially or completely beneath, behind, in front of, or over the capacitive sensing electrodes 502. For example, the inductive loop 408 can be positioned on a separate printed circuit board (PCB) layer that is positioned behind the PCB layer in which the capacitive sensing electrodes 502 are positioned.

In some embodiments, the capacitive sensing electrodes 502 can have a coverage density over the touch input area of less than about 90%, less than about 85%, less than about 80%, less than about 75%, less than about 70%, less than about 65%, less than about 60%, less than about 55%, less than about 50%, less than about 45%, less than about 40%, less than about 35%, or less than about 30%. In some embodiments, the capacitive sensing electrodes 502 can have a coverage density over the touch input area of between about 25-90%, between about 50%-85%, or between about 60-80%.

Figure 5:
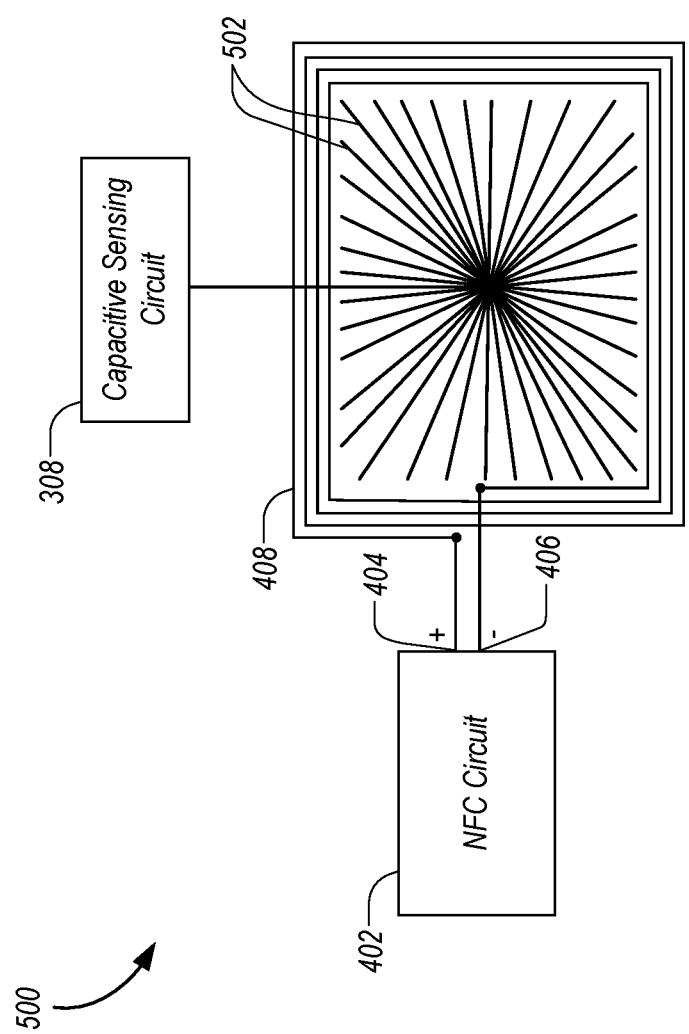
FIGS. 5-9B are schematic diagrams of different examples of a touch sensor assembly with a co-located NFC assembly in accordance with embodiments of the present technology.

As shown in FIG. 5, an NFC antenna in the form of an inductive loop 408 may extend around a perimeter of capacitive sensing electrodes 502. The inductive loop 408 may lie in the same plane or in a different plane than the capacitive sensing electrodes 502. The capacitive sensing electrodes are configured to have a relatively low density so as to provide increased free space that does not interfere with the magnetic flux generated by the inductive loop 408. In the illustrated embodiment, the capacitive sensing electrodes 502 form a plurality of linear conductors intersecting at a central point. However, the particular arrangement of the capacitive sensing electrodes 502 can vary, for example assuming a grid-like pattern, substantially parallel conductors, or any other suitable arrangement.

Figure 6A:
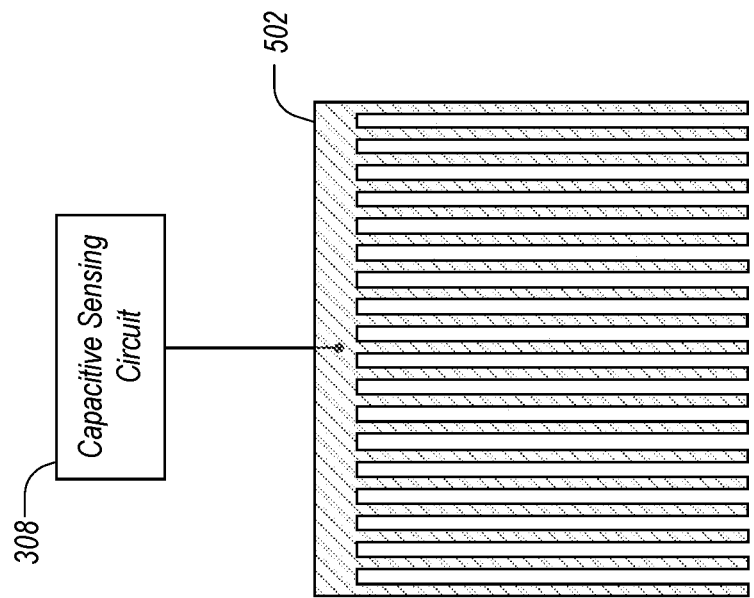
Figure 6A:
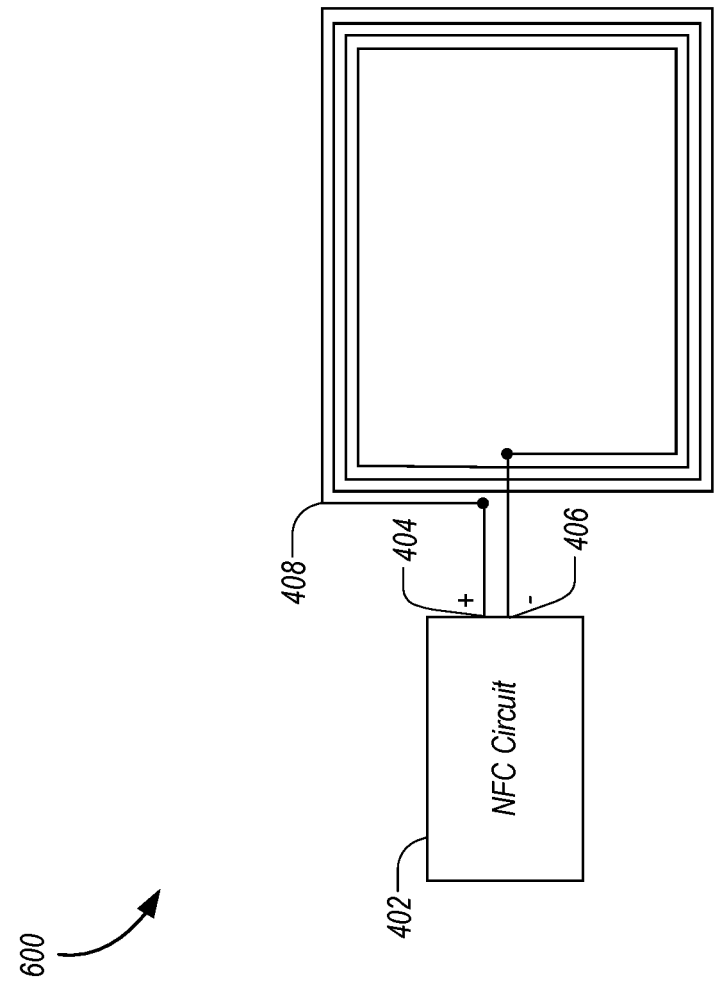

FIG. 6A-6B illustrates another example of an inductive loop 408 and a capacitive sensing electrode 512 arranged together. These components are illustrated separately in FIG. 6A for clarity, and shown co-located in FIG. 6B. As illustrated in FIGS. 6A-6B, the capacitive sensing electrode 502 is a comb-like electrode having a plurality of elongated conductors extending substantially parallel to one another with open space between them. This comb-like electrode 502 is disposed beneath or behind the inductive loop 408, as shown in FIG. 6B. Because of the open space between conductive portions of the electrode 502, operation of the NFC antenna 408 is not unduly hindered by the overlying capacitive sensing electrode 502.

Figure 7A:
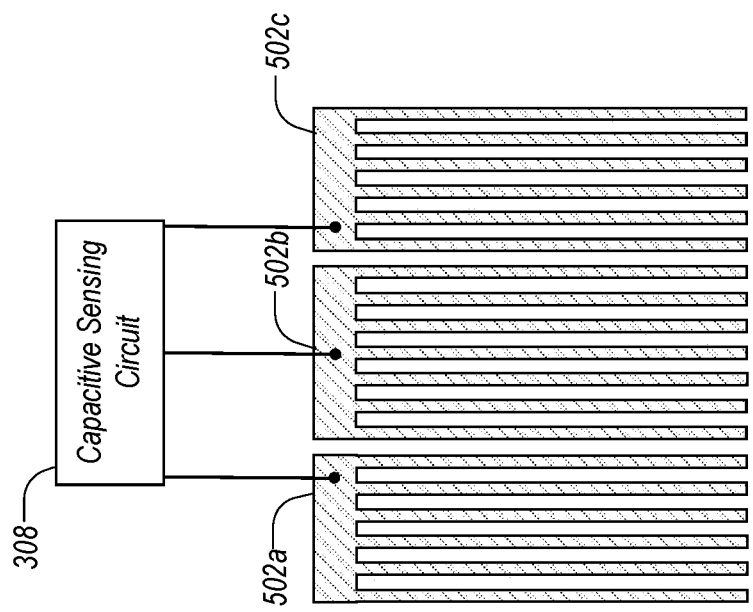
Figure 7A:
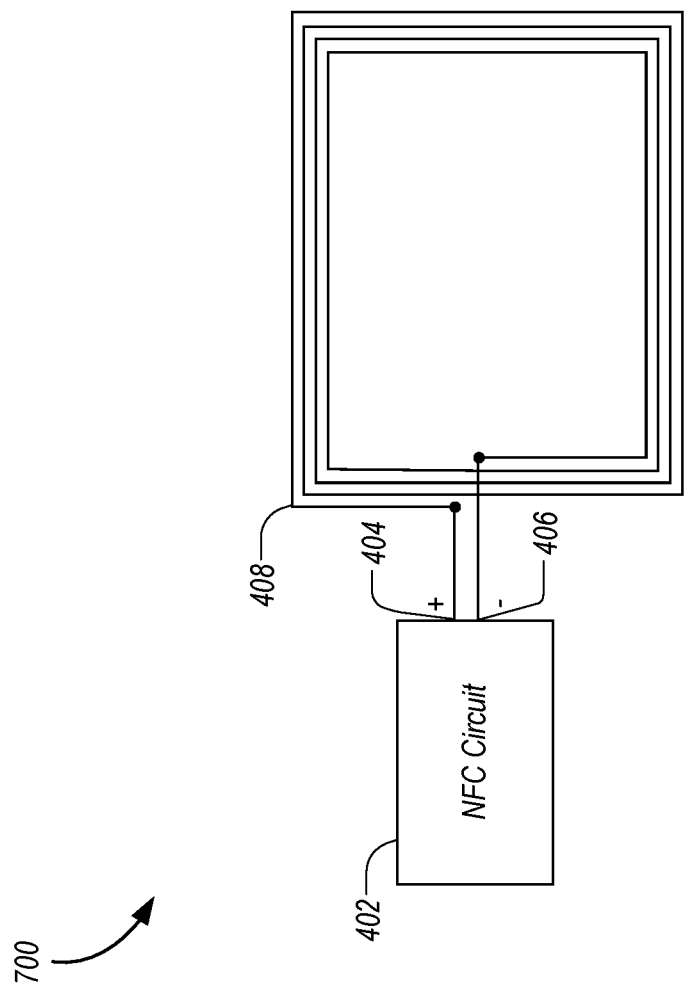
Figure 7B:
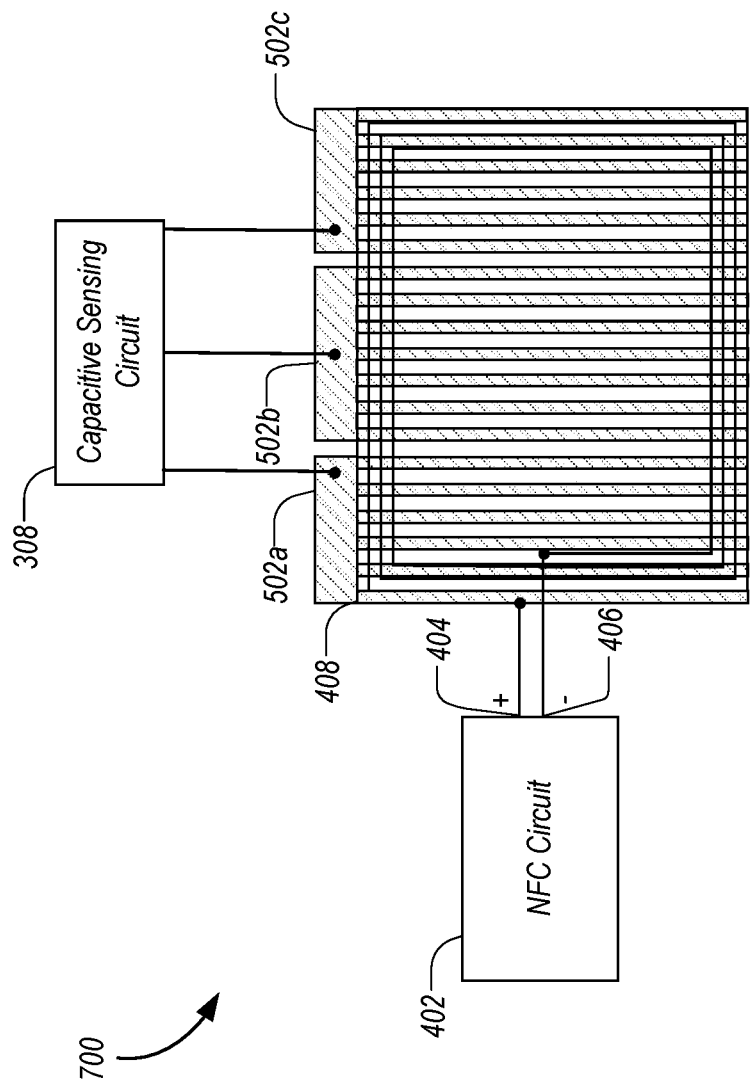

The embodiment shown in FIGS. 7A-7B can be similar to that described above with respect to FIGS. 6A-6B, except that the capacitive sensing electrode comprises three discrete sections 502a, 502b, and 502c, each of which is coupled to the capacitive sensing circuit 308. In this arrangement, the capacitive sensing circuit 308 can detect swipes or other gestures (in addition to simple taps), since the capacitive sensing circuit 308 can detect the user's finger as it moves from the region overlying one section 502a to the next section 502b.

Figure 8:
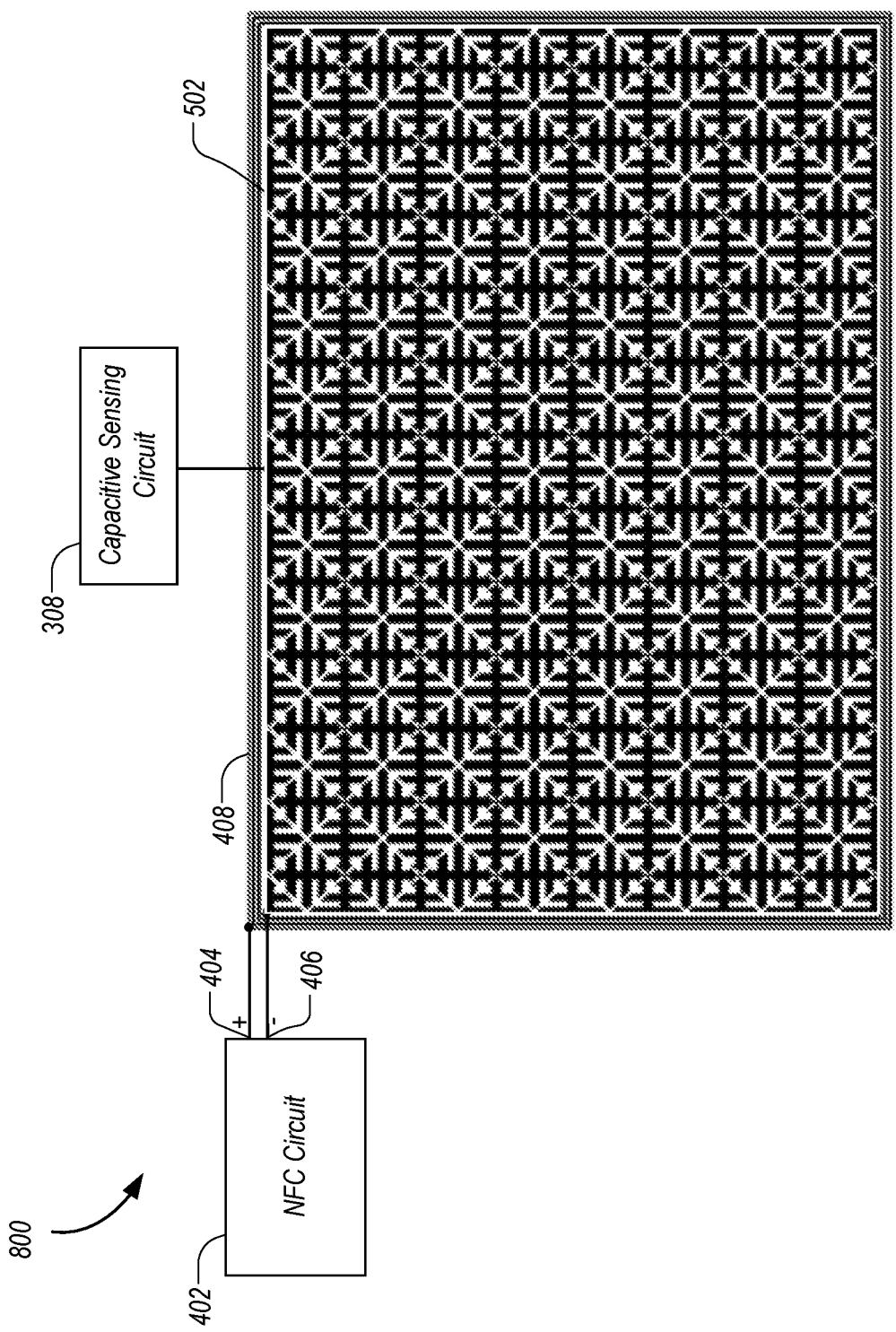

FIG. 8 illustrates an additional example of a touch sensor assembly 800 in which an NFC antenna in the form of an inductive loop 408 is co-located with a capacitive sensing electrode 502. In FIG. 8, the inductive loop 408 circumscribes the capacitive sensing electrode 502 (and may lie in the same or a different plane).

Figure 9A:
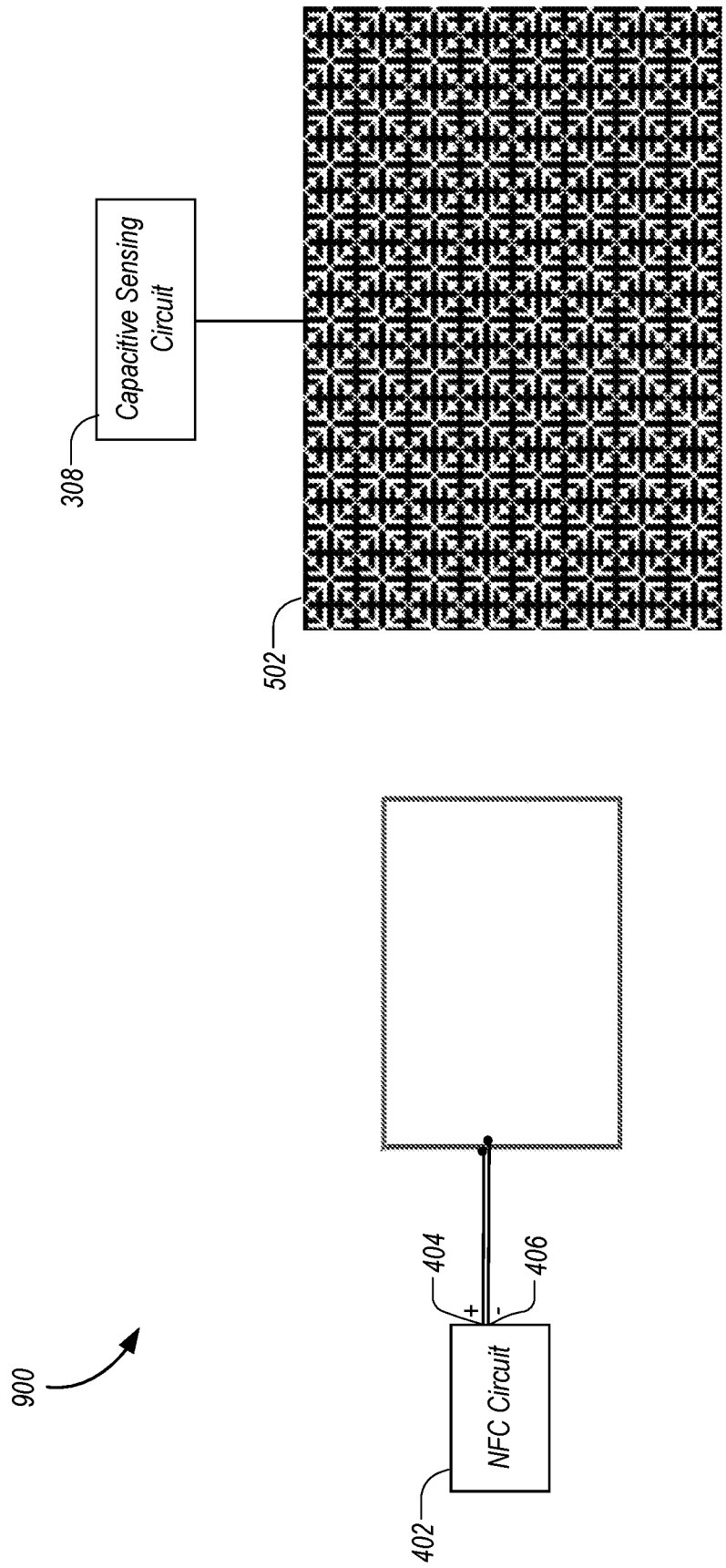

FIGS. 9A and 9B illustrate another example of a touch sensor assembly 900 in which an NFC antenna in the form of an inductive loop 408 is co-located with a capacitive sensing electrode 502. FIG. 9A illustrates these two components separated for clarity, while in FIG. 9B the inductive loop 408 and capacitive sensing electrode 502 are co-located. In contrast to the embodiment of FIG. 8, in FIG. 9 the inductive loop 408 is disposed behind the capacitive sensing electrode 502 and lies in a different plane.

In both FIGS. 8 and 9A-9B, the capacitive sensing electrodes 502 take the form of a grid of intersecting columns and rows, forming a trackpad-like array in which a user's gestures can be detected. The capacitive sensing circuit 308 is electrically coupled to the grid of sensing electrodes 502. Although FIGS. 8 and 9 schematically illustrate a single connection between the capacitive sensing circuit 308 and the grid of sensing electrodes 502, in various embodiments the capacitive sensing circuit 308 can include a plurality of separate connections to different components of the sensing electrodes 502. For example, in some embodiments the capacitive sensing circuit 308 can be separately coupled to each row and/or each column of the grid of sensing electrodes 502.

While conventional trackpad electrode arrangements are nearly solid, the capacitive sensing electrode 502 shown in FIGS. 8 and 9 is configured to have a relatively low density of metallic elements, thereby leaving adequate open space to enable near-field communication via the NFC circuit 402 and the inductive loop 408. As seen in FIGS. 8 and 9, the capacitive sensing electrodes 502 take the form of repeating diamond-shaped elements, each of which includes a central spine 802 extending along a first axis and a plurality of extensions 804 running perpendicular to the spine 802.

FIG. 10 illustrates an alternative arrangement of elements of a capacitive sensing electrode 502. Only four elements 1002a-1002d are illustrated for clarity, but the arrangement can be extended to an arbitrary size for sensing touch input. Each element 1002 is defined by a single meandering, serpentine conductive member. Advantageously, this arrangement provides for an increased density of conductive material along the edges of elements 1002 that face one another. For example, the upper right edge of element 1002d is a solid conductive member, and the corresponding lower left edge of element 1002c, while not conductive across the entire edge, still provides for a greater conductivity at the edge region than the embodiment illustrated in FIGS. 8 and 9. Because capacitive sensing measures changes in capacitance across these interfaces, the sensitivity and performance of the capacitive touch sensor is improved with higher conductivity along edge regions that face adjacent elements within the array. Accordingly, the meandering, serpentine configuration shown in FIG. 10 can provide both good performance in capacitive touch sensing (due to increased conductor density along edges) while also permitting a co-located NFC antenna to communicate effectively (due to decreased overall density of conductive elements in the array). FIGS. 8-10 illustrate only example configurations for trackpad electrode arrays 502. The geometry, dimensions, and arrangement of these electrodes can be varied to achieve the desired performance parameters, including varying the overall density of metallic elements in the electrode array such that magnetic flux generated by the NFC antenna 408 can pass through the electrode array to enable inductive coupling with an adjacent NFC device.

It should be appreciated that the touch sensor assemblies with integrated NFC antennas described herein (e.g., in FIGS. 4-9B) may be repurposed to create touch assemblies with integrated wireless charging (e.g., QI wireless charging) functionality. In some embodiments, the NFC circuit 402 can be replaced with a wireless charging circuit that is coupled to the inductive loop 408. In these embodiments, the wireless charging circuit may be configured to, for example, induce an alternating current in the inductive loop 408 that may be coupled via induction to another inductive loop in an external device. Thus, the wireless charging circuit may be configured to provide power wirelessly to the external device via the inductive loop 408 (e.g., the touch assembly may function as a wireless charging pad). Conversely, the wireless charging circuit may be configured to harvest energy from an alternating current induced in the inductive loop 408 (e.g., rectify an oscillatory signal induced in the inductive loop 408) by a wireless charging pad. Thus, the wireless charging circuit may be configured to receive power wirelessly from an external wireless charging pad via the inductive loop 408 (e.g., e.g., the touch assembly may function as a wireless power receiver).

In some embodiments, the touch assembly with integrated wireless charging functionality may employ information from the capacitive sensing circuit 308 to enhance the wireless charging functionality. For example, the output of the capacitive sensing circuit 308 may be employed to detect when the inductive loop 408 is proximate another wireless charging device (e.g., a wireless charging pad configured to provide energy wirelessly and/or a wireless charging received configured to receive energy wirelessly). Additionally (or alternatively), the output of the capacitive sensing circuit 308 may be employed to detect foreign objects that may interfere with wireless charging. For example, upon detection of a foreign object, wireless charging via the inductive loop 408 may be stopped or otherwise modified.

It should be appreciated that the techniques described herein may be employed to create devices that may not comprise a capacitive touch sensing assembly. For example, the techniques described herein may be employed to create a device with an integrated wireless charging and NFC assembly that share one or more common coils. Thus, the techniques described herein may be combined in any suitable manner and may omit a capacitive touch sensing assembly.

V. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

It should be appreciated that the touch sensor assemblies described herein may be readily applied to devices separate and apart from playback devices and/or NMDs. For example, the techniques described herein may be employed in wearable devices separate and apart from headphone devices such as a pair of smart glasses. Implementing a touch input in a pair of smart glasses may present similar problems to those described above with respect to headphones (e.g., limited footprint for a touch-sensitive input portion along with the need for wireless communication). Accordingly, the touch sensor assemblies disclosed herein may be readily applied to offer improved touch sensor performance while maintaining sufficient wireless connectivity. In such a smart glasses implementation, the smart glasses may comprise a housing including a frame front (e.g., configured to hold one or more lenses), a first temple rotatably coupled to the frame front, and a second temple rotatable coupled to the frame front. An antenna assembly 244, touch sensor assembly 246, and/or NFC assembly 248 may be at least partially housed in any suitable location, for example on or in the frame front, disposed in the left temple, disposed in the right temple, distributed between the frame front and the temples, etc.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

VI. Examples

Example 1. A playback device comprising: (i) one or more amplifiers configured to drive one or more speakers; (ii) a capacitive touch sensor assembly comprising: an electrode comprising a first conductor, a second conductor, a filter coupled between the first and second conductors; and a capacitive-touch circuit coupled to the electrode, wherein the capacitive-touch circuit is configured to deliver a capacitive sensing signal to the electrode; and (iii) a radiofrequency (RF) antenna assembly comprising: the second conductor; and an RF feed electrically coupled to the second conductor and configured to deliver an RF input signal to the second conductor.

Example 2. The playback device of example 1, wherein the filter comprises an inductor coupled in series between the first conductor and the second conductor.

Example 3. The playback device of example 1 or 2, wherein the filter substantially blocks the RF input signal.

Example 4. The playback device of any one of examples 1-3, wherein the filter substantially passes the capacitive sensing signal.

Example 5. The playback device of any one of examples 1-4, wherein the capacitive sensing signal has a lower frequency than the RF input signal.

Example 6. The playback device of any one of examples 1-5, wherein the capacitive sensing signal has a frequency of less than about 10 MHz.

Example 7. The playback device of any one of examples 1-6, wherein the RF input signal has a frequency of greater than about 2 GHz.

Example 8. The playback device of any one of examples 1-7, wherein the electrode is a first electrode, the filter is a first filter, and the RF signal is a first RF signal, wherein the capacitive touch sensor assembly further comprises a second electrode comprising a third conductor, a fourth conductor, and a second filter coupled between the third and fourth conductors, and wherein the RF antenna assembly comprises the fourth conductor and a second RF feed electrically coupled to the fourth conductor.

Example 9. The playback device of example 8, wherein the second RF feed is configured to deliver a second RF input signal to the fourth conductor and wherein the second RF input signal has a different frequency than the first RF input signal.

Example 10. The playback device of any one of examples 1-9, wherein dimensions of the second conductor are configured such that the second conductor operates as a quarter-wavelength radiator.

Example 11. The playback device of any one of examples 1-10, wherein the second conductor forms at least a portion of an inverted-F antenna.

Example 12. The playback device of any one of examples 1-11, wherein the playback device comprises a housing configured to be worn about a portion of a subject and wherein the one or more amplifiers are at least partially disposed in the housing.

Example 13. The playback device of example 12, wherein the housing is configured to be worn about a head of the subject, wherein the housing comprises left and right earpieces, and wherein the capacitive touch sensor assembly is disposed over a laterally outward surface of one of the earpieces.

Example 14. The playback device of any one of examples 1-13, further comprising an integrated near-field communication (NFC) assembly comprising: an inductive loop coupled to the capacitive-touch circuit of the capacitive touch sensor assembly; an NFC circuit coupled to the inductive loop, the NFC circuit configured to deliver an NFC drive signal to the inductive loop; and an isolation circuit disposed between the NFC circuit and the inductive loop.

Example 15. The playback device of any one of claims 1-14, further comprising a near-field communication (NFC) assembly, the NFC assembly comprising: a loop antenna disposed adjacent to or overlapping with the electrode of the capacitive touch sensor assembly; and an NFC circuit in electrical communication with the loop antenna, the NFC circuit configured to deliver an NFC drive signal to the loop antenna.

Example 16. A playback device comprising: (i) one or more amplifiers configured to drive one or more speakers; (ii) a capacitive touch sensor assembly comprising: a loop electrode; and a capacitive-touch circuit coupled to the loop electrode and configured to deliver a capacitive sensing signal to the loop electrode and configured to detect changes in capacitance; and (iii) a near-field communication (NFC) assembly comprising: the loop electrode; and an NFC circuit in electrical communication with the loop electrode, the NFC circuit configured to deliver an NFC drive signal to the loop electrode.

Example 17. The playback device of example 16, further comprising an isolation circuit coupled between the NFC circuit and the loop electrode.

Example 18. The playback device of examples 16 or 17, wherein the isolation circuit comprises a high-pass filter configured to substantially pass the drive signal from the NFC circuit to the loop electrode and to substantially block the capacitive sensing signal from reaching the NFC circuit.

Example 19. The playback device of any one of examples 16-18, wherein the isolation circuit comprises a ferrite bead.

Example 20. The playback device of any one of examples 16-19, wherein the capacitive sensing signal has a lower frequency than the NFC drive signal.

Example 21. The playback device of any one of examples 16-20, wherein the NFC drive signal has a frequency of between about 12-15 MHz.

Example 22. The playback device of any one of examples 16-21, wherein the capacitive sensing signal has a frequency of less than 10 MHz.

Example 23. The playback device of any one of examples 16-22, wherein the playback device comprises a housing configured to be worn about a portion of the subject and wherein the one or more amplifiers are at least partially disposed in the housing.

Example 24. The playback device of example 23, wherein the housing is configured to be worn about the head of the subject, wherein the housing comprises left and right earpieces, and wherein the capacitive touch sensor assembly is disposed over a laterally outward surface of one of the earpieces.

Example 25. The playback device of any one of examples 16-24, wherein: the capacitive touch sensor assembly further comprises an electrode comprising a first conductor, a second conductor, and a filter disposed in series between the first and second conductors, the capacitive-touch circuit is coupled to the first conductor and configured to deliver the capacitive sensing signal to the first conductor and detect changes in capacitance, the device further comprising a radiofrequency (RF) antenna assembly comprising: the second conductor; and an RF feed electrically coupled to the second conductor and configured to deliver an RF input signal to the second conductor.

Example 26. A playback device comprising: (i) one or more amplifiers configured to drive one or more speakers; (ii) a capacitive touch sensor assembly comprising: an electrode; and a capacitive-touch circuit coupled to the electrode and configured to deliver a capacitive sensing signal to the electrode and detect changes in capacitance; and (iii) a near-field communication (NFC) assembly comprising: a loop antenna disposed adjacent to or overlapping with the capacitive touch sensor assembly; and an NFC circuit in electrical communication with the loop antenna, the NFC circuit configured to deliver an NFC drive signal to the loop antenna.

Example 27. The playback device of example 26, wherein the capacitive touch sensor assembly comprises a plurality of electrodes disposed in an area, and wherein the loop antenna substantially circumscribes the area.

Example 28. The playback device of examples 26 or 27, wherein the loop antenna is disposed within the same plane as the electrode of the capacitive touch sensor assembly.

Example 29. The playback device of any one of examples 26-28, wherein the loop antenna is disposed beneath the electrode of the capacitive touch sensor assembly.

Example 30. The playback device of any one of examples 26-29, wherein the capacitive touch sensor comprises a trackpad having a plurality of conductive elements arranged over an area, and wherein a density of the conductive elements over the area is less than about 85%.

Example 31. The playback device of examples 30, wherein the density of the conductive elements over the area is less than about 75%.

Example 32. The playback device of any one of examples 26-31, wherein the NFC drive signal has a frequency of between about 12-15 MHz.

Example 33. The playback device of any one of examples 26-32, wherein the capacitive sensing signal has a frequency of less than about 10 MHz.

Example 34. The playback device of any one of examples 26-32, wherein the playback device comprises a housing configured to be worn about a portion of the subject and wherein the one or more amplifiers are at least partially disposed in the housing.

Example 35. The playback device of examples 34, wherein the housing is configured to be worn about the head of the subject, wherein the housing comprises left and right earpieces, and wherein the capacitive touch sensor assembly is disposed over a laterally outward surface of one of the earpieces.

Example 36. The playback device of any one of examples 1-35, wherein: the capacitive touch sensor assembly comprises a second electrode comprising a first conductor, a second conductor, and a filter coupled in series between the first and second conductors, the capacitive-touch circuit is coupled to the first conductor and configured to detect changes in capacitance, the device further comprising a radiofrequency (RF) antenna assembly comprising: the second conductor; and an RF feed electrically coupled to the second conductor and configured to deliver an RF input signal to the second conductor.

Example 37. A device comprising: a capacitive touch sensor assembly comprising: an electrode comprising a first conductor, a second conductor, and a filter coupled between the first and second conductors; and a capacitive-touch circuit coupled to the electrode, wherein the capacitive-touch circuit is configured to deliver a capacitive sensing signal to the electrode; and a radiofrequency (RF) antenna assembly comprising: the second conductor; and an RF feed electrically coupled to the second conductor and configured to deliver an RF input signal to the second conductor.

Example 38. A device comprising: a capacitive touch sensor assembly comprising: a loop electrode; and a capacitive-touch circuit coupled to the loop electrode and configured to deliver a capacitive sensing signal to the loop electrode and configured to detect changes in capacitance; and a near-field communication (NFC) assembly comprising: the loop electrode; and an NFC circuit in electrical communication with the loop electrode, the NFC circuit configured to deliver an NFC drive signal to the loop electrode.

Example 39. A device comprising: a capacitive touch sensor assembly comprising: an electrode; and a capacitive-touch circuit coupled to the electrode and configured to deliver a capacitive sensing signal to the electrode and detect changes in capacitance; and a near-field communication (NFC) assembly comprising: a loop antenna disposed adjacent to or overlapping with the capacitive touch sensor assembly; and an NFC circuit in electrical communication with the loop antenna, the NFC circuit configured to deliver an NFC drive signal to the loop antenna.

Example 40. A device comprising: a capacitive touch sensor assembly comprising: an electrode; and a capacitive-touch circuit coupled to the electrode and configured to deliver a capacitive sensing signal to the electrode and detect changes in capacitance; and a wireless charging assembly comprising: an inductive loop disposed adjacent to or overlapping with the capacitive touch sensor assembly; and a circuit in electrical communication with the inductive loop.

Example 41. The device of any of examples 37-40, wherein the device is at least one of: a playback device, an accessory for a playback device, an Internet-of-Things (IoT) device, an accessory for an IoT device, and/or a wearable device configured to be disposed around a portion of a subject.

Example 42. The device of example 40, wherein the circuit is configured to delivery an oscillatory signal to the inductive loop.

Example 43. The device of example 40, wherein the circuit is configured to rectify an oscillatory signal induced in the inductive loop by a wireless charger.

Example 44. A headphone device comprising: an earpiece; one or more amplifiers configured to drive one or more speakers; an electrode at least partially integrated into the earpiece, wherein the electrode comprises a first conductor, a second conductor (e.g., with dimensions such that the second conductor operates as an antenna), and a filter coupled between the first and second conductors; a capacitive-touch circuit coupled to the electrode, wherein the capacitive-touch circuit is configured to deliver a capacitive sensing signal to the electrode and/or detect changes in capacitance; a wireless radio electrically coupled to the second conductor, wherein the wireless radio is configured to facilitate communication over at least one data network (e.g., at least in part by causing the second conductor to emit at least one electromagnetic wave); at least one processor coupled to the capacitive-touch circuit and the wireless radio; at least one non-transitory computer-readable medium comprising program instructions that are executable by the at least one processor such that the headphone device is configured to: obtain, via the wireless radio and the second conductor, audio content; play back, via the one or more amplifiers, the audio content; during playback of at least part of the media content, detect, via the capacitive-touch circuit and the electrode, user input associated with a command to modify playback; and after detection of the user input, modify playback of the audio content (e.g., pause playback, change volume including increasing volume and/or decreasing volume, fast forward within a track, rewind within a track, skip to the next track, and/or return to a previous track).

Example 44. The headphone device of example 43, wherein the capacitive sensing signal has a first frequency range, wherein the wireless radio is configured to cause an RF input signal to be applied to the second conductor (e.g., the wireless radio is configured to generate and/or output the RF input signal (directly or indirectly) to the second conductor), and wherein RF input signal has a second frequency range that is non-overlapping with the first frequency range.

Example 45. The headphone device of example 44, wherein the first frequency range has a maximum frequency of less than about 10 MHz and/or wherein the second frequency range has a minimum frequency of greater than about 2 GHz.

Example 46. The headphone device of any of examples 44-45, wherein the filter has a cutoff frequency that is between the first frequency range and the second frequency range.

Example 47. The headphone device of any of examples 44-46, wherein the electrode is a first electrode, wherein the filter is a first filter, wherein the headphone device further comprises a second electrode comprising a third conductor, a fourth conductor, and a second filter coupled between the third and fourth conductors, and wherein the capacitive-touch circuit is coupled to the second electrode, and wherein the wireless radio is coupled to the fourth conductor.

Example 48. The headphone device of example 47, wherein the RF input signal is a first RF input signal and wherein the wireless radio is configured to cause a second RF input signal to be applied to the fourth conductor (e.g., the wireless radio is configured to generate and/or output the second RF input signal (directly or indirectly) to the fourth conductor)

Example 49. The headphone device of example 48, wherein the second RF input signal has a third frequency range that is non-overlapping with each of the first and second frequency ranges.

Example 50. The headphone device of any of examples 44-49, wherein dimensions of the second conductor are configured such that the second conductor operates as a quarter-wavelength radiator.

Example 51. The headphone device of any of examples 44-50, wherein the second conductor forms at least a portion of an inverted-F antenna.

Example 52. The headphone device of example 44-51, wherein the electrode is a first electrode, wherein the headphone device further comprises a second electrode that is coupled to the capacitive-touch circuit, and wherein the capacitive-touch circuit is configured to deliver a capacitive sensing signal to the second electrode and detect changes in capacitance.

Example 53. The headphone device of example 52, further comprising: a near-field communication (NFC) circuit electrically coupled to the second electrode, wherein the NFC circuit configured to deliver an NFC drive signal to the second electrode.

Example 54. The headphone device of example 53, wherein the at least one non-transitory computer-readable medium further comprises program instructions that are executable by the at least one processor such that the playback device is configured to: communicate, using the NFC circuit and the second electrode, with at least one of: an external device or an NFC tag.

Example 55: The headphone device of example 53, wherein the NFC circuit is configured to harvest energy via the second electrode from an interrogation signal (e.g., from an NFC reader) and generate the NFC drive signal using at least some of the harvested energy.

Example 56: The headphone device of any of examples 53-55, further comprising an isolation circuit coupled between the NFC circuit and the second electrode.

Example 57: The headphone device of any of examples 53-56, wherein the capacitive sensing signal has a first frequency range and wherein the NFC drive signal has a second frequency range that is non-overlapping with the first frequency range.

Example 58. A wearable device comprising: a housing configured to be worn about a portion of a subject; one or more amplifiers configured to drive one or more speakers; an electrode at least partially integrated into the housing, wherein the electrode comprises a first portion and a second portion, wherein the second portion has dimensions such that the second conductor operates as an antenna (e.g., a radio frequency antenna); a capacitive-touch circuit coupled to the electrode, wherein the capacitive-touch circuit is configured to deliver a capacitive sensing signal to the electrode and detect changes in capacitance; a wireless radio electrically coupled to the second portion, wherein the wireless radio is configured to facilitate communication over at least one data network (e.g., at least in part by causing the second portion to emit at least one electromagnetic wave); at least one processor coupled to the capacitive-touch circuit and the wireless radio; at least one non-transitory computer-readable medium comprising program instructions that are executable by the at least one processor such that the headphone device is configured to: obtain, via the wireless radio and the second portion, audio content; play back, via the one or more amplifiers, the audio content; during playback of at least part of the media content, detect, via the capacitive-touch circuit and the electrode, user input associated with a command to modify playback; and after detection of the user input, modify playback of the audio content (e.g., pause playback, change volume including increasing volume and/or decreasing volume, fast forward within a track, rewind within a track, skip to the next track, and/or return to a previous track).

Example 59. The wearable device of example 58, wherein the capacitive sensing signal has a first frequency range, wherein the wireless radio is configured to cause an RF input signal to be applied to the second conductor (e.g., the wireless radio is configured to generate and/or output the RF input signal (directly or indirectly) to the second conductor), and wherein RF input signal has a second frequency range that is non-overlapping with the first frequency range.

Example 60. The wearable device of example 59, wherein the first frequency range has a maximum frequency of less than about 10 MHz and/or wherein the second frequency range has a minimum frequency of greater than about 2 GHz.

Example 61. The wearable device of any of examples 59-60, wherein the wearable device is a headphone device and wherein the housing comprises an earpiece.

Example 62. The wearable device of any of examples 59-60, wherein the wearable device is a pair of glasses and wherein the housing comprises at least one of: a frame front, a left temple, or a right temple.

The invention claimed is:

1. A headphone device comprising:
   an earpiece;
   one or more amplifiers configured to drive one or more speakers;
   a capacitive-touch sensor assembly configured to detect touch-based user inputs and including:
     a capacitive sensing electrode at least partially integrated into the earpiece, wherein the capacitive sensing electrode comprises a first conductor, a second conductor, and a filter coupled between the first and second conductors, and
     a capacitive-touch circuit coupled to the capacitive sensing electrode, wherein the capacitive-touch circuit is configured to deliver a capacitive sensing signal to the capacitive sensing electrode and detect changes in capacitance indicative of the touch-based user inputs, and wherein the capacitive sensing signal has a first frequency range;
   a wireless radio electrically coupled to the second conductor and configured to cause an RF input signal to be applied to the second conductor, wherein the wireless radio is configured to facilitate communication over at least one data network, and wherein the RF input signal has a second frequency range that is non-overlapping with the first frequency range;
   at least one processor coupled to the capacitive-touch circuit and the wireless radio; and
   at least one non-transitory computer-readable medium comprising program instructions that are executable by the at least one processor such that the headphone device is configured to:
     obtain, via the wireless radio and the second conductor, audio content;
     play back, via the one or more amplifiers, the audio content;
     during playback of at least part of the audio content, detect, via the capacitive-touch circuit and the capacitive sensing electrode, user input associated with a command to modify playback; and
     after detection of the user input, modify playback of the audio content.

2. The headphone device of claim 1, wherein the first frequency range has a maximum frequency of less than about 10 MHz and wherein the second frequency range has a minimum frequency of greater than about 2 GHz.

3. The headphone device of claim 1, wherein the filter has a cutoff frequency that is between the first frequency range and the second frequency range.

4. The headphone device of claim 1, wherein the capacitive sensing electrode is a first capacitive sensing electrode, wherein the filter is a first filter, wherein the headphone device further comprises a second capacitive sensing electrode comprising a third conductor, a fourth conductor, and a second filter coupled between the third and fourth conductors, and wherein the capacitive-touch circuit is coupled to the second capacitive sensing electrode, and wherein the wireless radio is coupled to the fourth conductor.

5. The headphone device of claim 4, wherein the RF input signal is a first RF input signal and wherein the wireless radio is configured to cause a second RF input signal to be applied to the fourth conductor.

6. The headphone device of claim 5, wherein the second RF input signal has a third frequency range that is non-overlapping with each of the first and second frequency ranges.

7. The headphone device of claim 1, wherein dimensions of the second conductor are configured such that the second conductor operates as a quarter-wavelength radiator.

8. The headphone device of claim 1, wherein the second conductor forms at least a portion of an inverted-F antenna.

9. The headphone device of claim 1, wherein the capacitive sensing electrode is a first capacitive sensing electrode, wherein the headphone device further comprises a second capacitive sensing electrode that is coupled to the capacitive-touch circuit, and wherein the capacitive-touch circuit is configured to deliver the capacitive sensing signal to the second capacitive sensing electrode and detect changes in capacitance.

10. The headphone device of claim 9, further comprising:
    a near-field communication (NFC) circuit electrically coupled to the second capacitive sensing electrode, wherein the NFC circuit is configured to deliver an NFC drive signal to the second capacitive sensing electrode.

11. The headphone device of claim 10, wherein the at least one non-transitory computer-readable medium further comprises program instructions that are executable by the at least one processor such that headphone device is configured to:
    communicate, using the NFC circuit and the second capacitive sensing electrode, with at least one of: an external device or an NFC tag.

12. The headphone device of claim 10, wherein the NFC circuit is configured to harvest energy via the second capacitive sensing electrode from an interrogation signal and generate the NFC drive signal using at least some of the harvested energy.

13. The headphone device of claim 10, further comprising an isolation circuit coupled between the NFC circuit and the second capacitive sensing electrode.

14. The headphone device of claim 10, wherein the NFC drive signal has a second frequency range that is non-overlapping with the first frequency range.

15. A wearable device comprising:
    a housing configured to be worn about a portion of a subject;
    one or more amplifiers configured to drive one or more speakers;
    a capacitive-touch sensor assembly having an integrated antenna and configured to detect touch-based user inputs, the capacitive-touch sensor assembly including:
      a capacitive sensing electrode at least partially integrated into the housing, wherein the capacitive sensing electrode comprises a first portion and a second portion, wherein the second portion has dimensions such that the second portion operates as the antenna, and
      a capacitive-touch circuit coupled to the capacitive sensing electrode, wherein the capacitive-touch circuit is configured to deliver a capacitive sensing signal to the capacitive sensing electrode and detect changes in capacitance indicative of the touch-based user inputs, and wherein the capacitive sensing signal has a first frequency range;
a wireless radio electrically coupled to the second portion and configured to cause an RF input signal to be applied to the second portion of the capacitive sensing electrode, wherein the wireless radio is configured to facilitate communication over at least one data network, and wherein the RF input signal has a second frequency range that is non-overlapping with the first frequency range;
at least one processor coupled to the capacitive-touch circuit and the wireless radio; and
at least one non-transitory computer-readable medium comprising program instructions that are executable by the at least one processor such that the wearable device is configured to:
obtain, via the wireless radio and the second portion, audio content;
play back, via the one or more amplifiers, the audio content;
during playback of at least part of the audio content, detect, via the capacitive-touch circuit and the capacitive sensing electrode, user input associated with a command to modify playback; and
after detection of the user input, modify playback of the audio content.

16. The wearable device of claim 15, wherein the first frequency range has a maximum frequency of less than about 10 MHz and wherein the second frequency range has a minimum frequency of greater than about 2 GHz.

17. The wearable device of claim 15, wherein the wearable device is a headphone device and wherein the housing comprises an earpiece.

18. The wearable device of claim 15, wherein the wearable device is a pair of glasses and wherein the housing comprises at least one of: a frame front, a left temple, or a right temple.

* * * * *